US012494188B2

(12) United States Patent
Ellis

(10) Patent No.: US 12,494,188 B2
(45) Date of Patent: Dec. 9, 2025

(54) SYSTEMS AND METHODS FOR ONBOARD, REAL-TIME PICKUP BLENDING FOR ELECTRIC GUITARS AND BASSES

(71) Applicant: Mark Ellis, Cypress, TX (US)

(72) Inventor: Mark Ellis, Cypress, TX (US)

( * ) Notice: Subject to any disclaimer, the term of this patent is extended or adjusted under 35 U.S.C. 154(b) by 150 days.

(21) Appl. No.: 18/381,312

(22) Filed: Oct. 18, 2023

(65) Prior Publication Data

US 2024/0046906 A1 Feb. 8, 2024

Related U.S. Application Data

(63) Continuation-in-part of application No. 17/588,513, filed on Jan. 31, 2022, now Pat. No. 11,817,072, (Continued)

(51) Int. Cl.
*G10H 3/18* (2006.01)
*G10D 1/08* (2006.01)
(Continued)

(52) U.S. Cl.
CPC ............... *G10H 3/186* (2013.01); *G10D 1/08* (2013.01); *G10D 15/00* (2013.01); *G10H 1/08* (2013.01); *G10H 1/14* (2013.01); *G10H 3/181* (2013.01); *G10H 3/182* (2013.01); *G10H 3/185* (2013.01); *G10H 2210/311* (2013.01); *G10H 2210/565* (2013.01); *G10H 2220/515* (2013.01)

(58) Field of Classification Search
None
See application file for complete search history.

(56) References Cited

U.S. PATENT DOCUMENTS 3,544,696 A * 12/1970 Daniel .................. G10H 3/182
84/741
4,480,520 A 11/1984 Gold
(Continued)

FOREIGN PATENT DOCUMENTS

GB 2470581 A 12/2010

OTHER PUBLICATIONS

Bourns, "Bourns(R) Model PDB182-GTRB Blend-Balance Guitar Potentiometers," Brochure, dated Aug. 2014, 5-pgs.
(Continued)

*Primary Examiner* — Patrick Mcatee
(74) *Attorney, Agent, or Firm* — Cabello Hall Zinda, PLLC

(57) ABSTRACT

A system and a kit can be used for onboard, real-time blending for electronic pickups to produce various tonal combinations. In one example, at least one of the electronic pickups has dual coils. The dual coil pickup can be electrically connected to a switching circuit positioned on a stringed instrument. The switching circuit can be adjustable in real-time to select between at least two conditions for a signal of the dual coil pickup. In one instance, the conditions can select north coil only, series wiring of the dual coils, or south coil only. Alternatively, the conditions can select series wiring or parallel wiring of the dual coils. Each of the electronic pickups is electrically connected to a taper circuit positioned on the instrument. Each taper circuit is adjustable in real-time to vary an amplitude of the signal from the respective electronic pickup for output of the instrument.

25 Claims, 15 Drawing Sheets

Related U.S. Application Data which is a continuation of application No. 17/397,627, filed on Aug. 9, 2021, now Pat. No. 11,276,381.

(51) Int. Cl.

| | |
|---|---|
| ***G10D 15/00*** | (2006.01) |
| ***G10H 1/08*** | (2006.01) |
| ***G10H 1/14*** | (2006.01) |

(56) References Cited

U.S. PATENT DOCUMENTS

| | | | | |
|---|---|---|---|---|
| 4,545,278 | A * | 10/1985 | Gagon | G10H 3/182 984/369 |
| 4,632,002 | A * | 12/1986 | Clevinger | G10H 3/185 84/DIG. 24 |
| 4,913,024 | A | 4/1990 | Carriveau | |
| 5,007,324 | A * | 4/1991 | DeMichele | G10H 1/0058 84/DIG. 26 |
| 5,136,918 | A * | 8/1992 | Riboloff | G10H 3/18 84/723 |
| 5,136,919 | A * | 8/1992 | Wolstein | G10H 1/08 84/742 |
| 5,557,058 | A * | 9/1996 | Lace | H01C 10/34 338/73 |
| 5,723,804 | A | 3/1998 | Michael | |
| 5,744,744 | A * | 4/1998 | Wakuda | G10H 1/46 84/633 |
| 5,780,760 | A | 7/1998 | Riboloff | |
| 5,866,834 | A | 2/1999 | Burke et al. | |
| 6,121,537 | A | 9/2000 | Pawar et al. | |
| 8,704,075 | B2 | 4/2014 | Gournis | |
| 9,153,218 | B1 * | 10/2015 | Micek | G10H 3/186 |
| 9,653,055 | B1 * | 5/2017 | Savage | G10H 1/32 |
| 9,747,882 | B1 | 8/2017 | Micek | |
| 10,115,379 | B1 | 10/2018 | Juszkiewicz et al. | |
| 11,276,381 | B1 | 3/2022 | Ellis | |
| 2005/0040022 | A1 * | 2/2005 | Turner | G10H 3/182 200/538 |
| 2006/0011051 | A1 | 1/2006 | Aivbrosino | |
| 2013/0327202 | A1 * | 12/2013 | Mills | G10H 3/18 84/726 |
| 2014/0150630 | A1 * | 6/2014 | Juszkiewicz | G10H 1/44 84/626 |
| 2014/0373703 | A1 * | 12/2014 | Whorton | G10H 3/143 84/743 |
| 2019/0057679 | A1 * | 2/2019 | Baker | G10H 1/46 |
| 2020/0058280 | A1 * | 2/2020 | Shaw | G10H 3/183 |
| 2021/0151022 | A1 | 5/2021 | Hoover | |

OTHER PUBLICATIONS

Fralin Pickups, "Modified Stratocaster(R) Wiring Diagram," Brochure, copyright 2018-2019, 1-pg.

Lollar Pickups, "5 Way Blender Mod for Stratocaster(R)," Brochure, undated, downloaded from www.lollarguitars.com/pickup-wiring-diagrams/StratBlender_WiringDiagram.pdf on Nov. 30, 2023, 1-pg.

Music City Bridge, "Nashville 3 Pickup Blend Wiring Harness," webpage downloaded from musiccitybridge.com/products/nashville-3-pickup-blend-wiring-harness on Nov. 30, 2023, copyright 2023.

Porter Pickups, "Strat(R) Blender Configuration," Brochure, undated, downloaded from www.porterpickups.com/wp-content/uploads/2016/01/Strat-Blender-Diagram.pdf on Nov. 30, 2023, 1-pg.

Radio Shop Pickups, "Radioshop Telecaster Tone System," webpage downloaded from www.radioshoppickups.com/product/radioshop-telecaster-tone-system/ on Nov. 30, 2023.

Seymour Duncan, "Broadcaster with Blend," Brochure, copyright 2006, 1-pg.

The Guitar Wiring Blog, "How to Wire a Blend Pot?" webpage downloaded from guitarwiring.blogspot.com/2011/05/how-to-wire-blend-pot.html, dated May 5, 2011, 2-pgs.

* cited by examiner

Coil Splitting PCB

Series / Parallel PCB

Coil Splitting Printed PCB

Series / Parallel Printed PCB

SYSTEMS AND METHODS FOR ONBOARD, REAL-TIME PICKUP BLENDING FOR ELECTRIC GUITARS AND BASSES

CROSS-REFERENCE TO RELATED APPLICATION

The present application is a continuation-in-part of U.S. patent application Ser. No. 17/588,513 filed Jan. 31, 2022, which is a continuation of U.S. patent application Ser. No. 17/397,627 filed Aug. 9, 2021—now U.S. Pat. No. 11,276, 381, the disclosures of which are each incorporated by reference in their entireties.

FIELD OF THE DISCLOSURE

The present disclosure generally relates to electric guitar and bass pickups, and more particularly to onboard, real-time pickup blending for electric guitars and basses.

BACKGROUND

Typically, in order to provide the tones needed to record and/or perform music, multiple guitars and/or basses need to be used. More specifically, a guitarist has to utilize different guitars to get all of the desired tones. Each guitar uses a variation of different pickup combinations. A guitar has a pickup selector switch so the user can "select" which pickup from which to output tones. Industry standard pickup selector switches include: a 5-way selector, a 3-way selector, and on/off switches. The different pickup layout types were made popular by these main iconic guitars: Stratocaster®, Telecaster®, and Gibson Les Paul®. (STRATOCASTER and TELECASTER are registered trademarks of FENDER MUSICAL INSTRUMENTS CORPORATION.) (LES PAUL is a registered trademark of GIBSON BRANDS, INC.)

SUMMARY

Embodiments of the present disclosure may provide for onboard, real-time pickup blending for electric guitars/basses that may utilize every possible tonal combination that double coil pickups can offer. Embodiments of the present disclosure may remove the industry standard pickup toggle switch from electric guitar/bass instruments. Instead of a user being limited to only using one pickup at a time to be selected, embodiments of the present disclosure may allow the user to mix in any combination of the pickups (top, bottom, or both) at any time. Accordingly, multiple pickups can be on at the same time and/or the user may blend in (or out) any percentage of any of the pickups that the user wishes to create a large combination of tones.

Embodiments of the present disclosure may provide a system for onboard, real-time pickup blending for electric guitars/basses comprising two separate options: coil splitting or series/parallel wiring. Coil splitting may include, at minimum, one Humbucker, but may be used if there are at least two double coil (Humbucker) pickups. Each of the at least two double coil pickups can include: a toggle switch to select a tonal characteristic of the pickup; and an off/on blender knob capable of blending sound from the pickup from 0-100% to a final mix; an optional master volume knob; and an optional master tone knob. A two-way toggle switch or a three-way toggle switch can be used for the coil splitting. The two-way toggle can split the multi-coil pickup as (i) both coils in series or (ii) North or South coil only. Alternatively, a three-way toggle switch is used for more tonal possibilities by triple splitting the multi-coil pickup into (i) north coil only, (ii) both coils in series, or (iii) south coil only.

In another embodiment, a series/parallel option may include a two-way toggle switch to select how the coils within a double coil pickup may be wired (in series versus in parallel), and an on/off blender knob capable of blending sound from the pickup from 0-100% to a final mix; an optional master volume knob, and an optional master tone knob.

In both embodiments, the master volume knob may be a potentiometer, and the master tone knob may be a potentiometer. Several types of potentiometers and resistive values can be used. For example, potentiometers with an audio taper or a linear taper can be used, and the resistive values of 250k Ohm, 500k Ohm, or others can be used based on preferences.

For coil splitting, the tonal characteristic may be selected from the following: North single coil only, series, or South single coil only. The off/on blender knob may be a potentiometer, which can have a resistive value of 500k Ohm. The at least two double coil pickups may comprise at least a neck pickup; a middle pickup; and a bridge pickup. For series/parallel, the tonal characteristic may be selected from the following: both coils within the double coil pickup wired as series or wired as parallel.

A neck pickup blender knob may be off (0%), a middle pickup blender knob may be off (0%), a bridge pickup blender knob may be on (100%), and a bridge pickup toggle switch may be set to middle to create a Gibson Les Paul Rock sound. The neck pickup blender knob and/or the middle pickup blender knob may be capable of being adjusted up in percentage to color a tone to cut through a mix. A neck pickup blender knob may be on (100%), a middle pickup blender knob may be off (0%), a bridge pickup blender knob may be off (0%), and a neck pickup toggle switch may be set in a down position to create a lead guitar tone. A neck pickup blender knob may be on (100%), a middle pickup blender knob may be off (0%), a bridge pickup blender knob may be on (100%), a neck pickup toggle switch may be set to down, and a bridge pickup toggle switch may be set to middle to create a combination of a Gibson Les Paul Rock sound and a lead guitar tone. The neck pickup blender knob and/or the bridge pickup blender knob may be capable of being adjusted down in percentage to make the combination less bright. The three-way toggle switch of each of the at least two double coil pickups may be adjustable in real time. The off/on blender knob of each of the at least two double coil pickups may be adjustable in real time. Each of the at least two double coil pickups, the master volume knob, and the master tone knob may be provided on a printed circuit board.

A system disclosed herein can be used on a stringed instrument, such as an electric guitar, bass, or the like, having an output and having pickups. At least one of the pickups can have dual coils. The system comprises a switching circuit and a plurality of taper circuits, which are configured to position on the stringed instrument. The switching circuit is associated respectively with each of the at least one of the pickups having the dual coils. Each respective switching circuit is electrically connected to the dual coils and is adjustable in real-time to select between at least two conditions for a signal of the at least one pickup having the dual coils. For its part, each taper circuit is associated with a respective one of the pickups. Each taper circuit is electrically connected between the respective pickup and the output and is adjustable in real-time to vary an amplitude of the signal from the respective pickup for output to the instrument's output.

In one example, the switching circuit is adjustable in real-time to select between conditions that include selecting a north coil only, selecting a south coil only coils, and selecting a series wiring of the north and south coils. In another example, the switching circuit is adjustable in real-time to select between conditions that include selecting a series wiring of the dual coils and selecting a parallel wiring of the dual coils.

A stringed instrument disclosed herein comprises an output, pickups, a switching circuit, and taper circuits. At least one of the pickups has dual coils. The switching circuit and a plurality of taper circuits are configured to position on the stringed instrument. The switching circuit is associated respectively with each of the at least one of the pickups having the dual coils. Each switching circuit is electrically connected to the dual coils and is adjustable in real-time to select between at least two conditions for a signal of the at least one pickup having the dual coils. For their part, each of the taper circuits is associated respectively with each of the pickups. Each taper circuit is electrically connected between the respective pickup and the output and is adjustable in real-time to vary an amplitude of the signal from the respective pickup for output to the instrument's output.

A kit disclosed herein can be used on a stringed instrument having an output and having one (first) pickup, which has a plurality of first pickup leads. The kit comprises an output terminal, a first switch terminal, a first taper terminal, and a plurality of first lead contacts. The output terminal has a hot contact and a ground contact configured to connect to the instrument's output. The ground contact is disposed in electric communication with a circuit ground. The first switch terminal has first, second, and third switch contacts. The third switch contact is disposed in electric communication with the circuit ground. The first taper terminal has an input contact, an output contact, and a ground contact. The ground contact is disposed in electric communication with the circuit ground, and the output contact is disposed in electric communication with the hot contact of the output terminal. The first lead contacts are configured to connect to the first pickup leads of the first pickup. The first lead contacts include: a first of the first lead contacts disposed in electric communication with the first switch contact of the first switch terminal and the input contact of the first taper terminal; a second of the first lead contacts disposed in electric communication with the second switch contact of the first switch terminal; a third of the first lead contacts disposed in electric communication with the second switch contact of the first switch terminal; and a fourth of the first lead contacts disposed in electric communication with the circuit ground.

For a stringed instrument having two (first and second) pickups, the kit can comprise first and second switch terminals, first and second taper terminals, and first and second sets of lead contacts configured respectively for the first and second pickups. For a stringed instrument having up to three (first, second, and third) pickups, the kit can comprise first, second, and third switch terminals; first, second, and third taper terminals; and first, second, and third sets of lead contacts configured respectively for the first, second, and third pickups.

The kit can further comprise a volume terminal having an input contact, an output contact, and a ground contact. The input contact can be disposed in electric communication with the output terminals of the taper terminals. The output contact can be disposed in electric communication with the hot contact of the output terminal, and the ground contact can be disposed in electric communication with the circuit ground. For the kit having such a volume terminal, the kit can include at least one of: a volume potentiometer configured to connect in electrical communication with the volume terminal; and a jumper configured to connect in electrical communication with the volume terminal. Therefore, the kit can operate with a volume potentiometer, or the jumper can be used instead.

The kit can further comprise a tone terminal at least having an input contact and an output contact. The input contact can be disposed in electric communication with input contact of the volume terminal, and the output contact can be disposed in electric communication with ground terminal of the volume terminal. For the kit having such a tone terminal, the kit can include a tone potentiometer configured to connect in electrical communication with the tone terminal.

The kit can comprise a circuit board having connectors and electronic traces. The connectors can be disposed on the circuit board and can be provided for one or more of the output terminal, the switch terminal(s), the taper terminal(s), and the lead contacts. The electronic traces are printed on the circuit board for electronic communication therebetween the contacts of the respective terminals.

The kit can function with plug-in-play capabilities. The user can attach any of the components desired and can leave other components disconnected. In fact, a kit configured for three pickups can be completely disconnected with no potentiometers or switches connected to the board. The jumper can be connected to the volume terminal, the pickup wires can be connected to the pickup terminals, and the output jack can be connected to the output terminal. In this arrangement, then the instrument will function, but will lack any switches, master volume, master tone, and blending.

The string instrument may have a dual coil pickup for any one of the pickups. In that instance, the kit can further comprise a switch configured to connect in electrical communication with the respective switch terminal. The switch can be configured to switch between North coil only, South coil only, and series wiring of the dual coils.

The string instrument may have a single coil pickup for any one of the pickups. In that instance, a hot lead of the single coil pickup can connect to the first of the respective lead contacts, and a ground lead the single coil pickup can connect to the fourth of the respective lead contacts.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
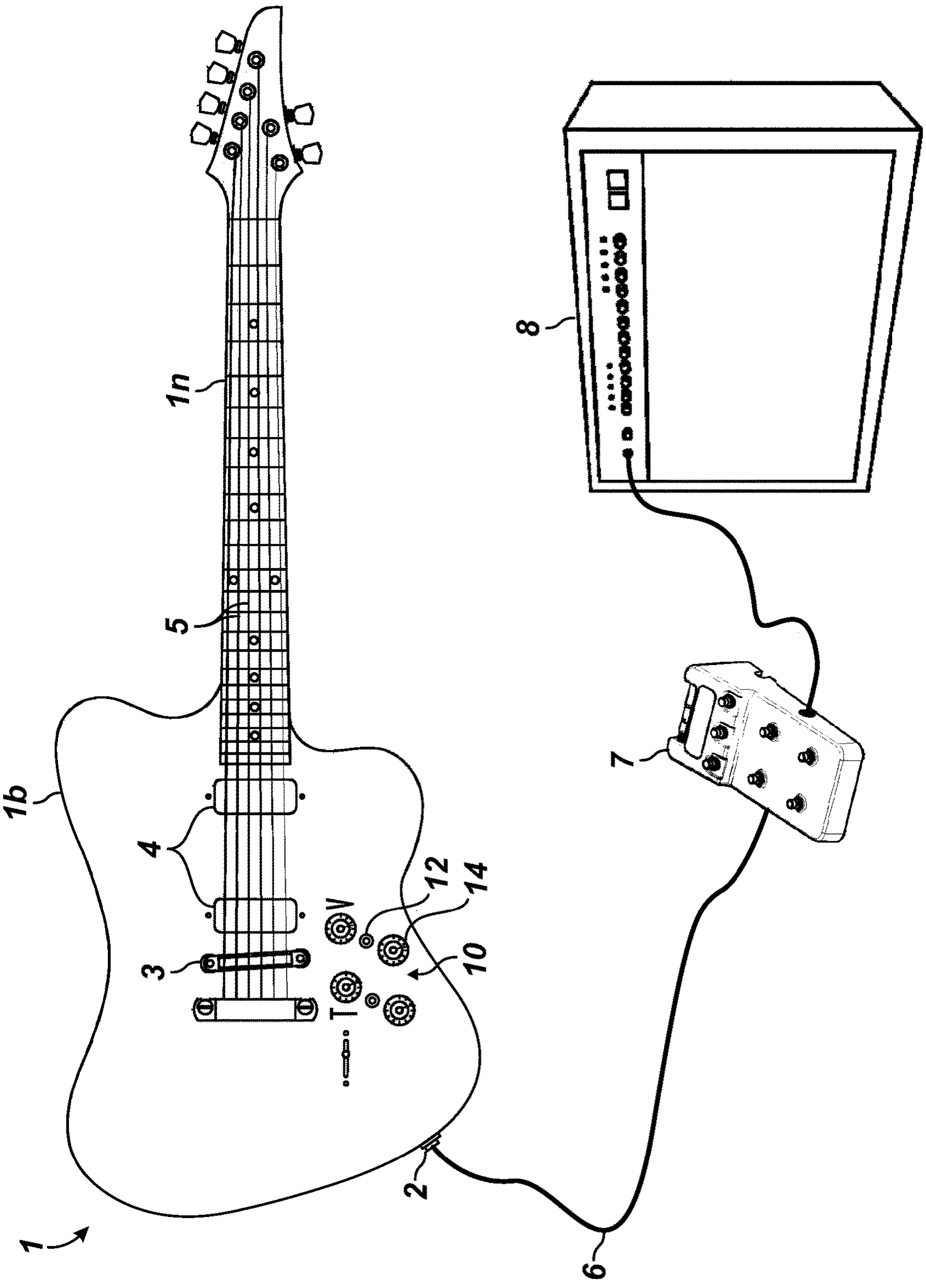
FIG. 1 depicts an electric guitar configured with a system according to the present disclosure.

FIG. 1 depicts an electric stringed instrument 1 configured with an analog electronic system 10 according to the present disclosure. The electric stringed instrument 1 shown here is an electric guitar having a neck 1*n* and a body 1*b*. The teachings of the present disclosure can apply to other electric stringed instruments, including an acoustic guitar, a bass guitar, a violin, a mandolin, etc.

Strings 5 extend from the headstock of the neck 1*n* to a bridge 3 mounted on the body 1*b* of the guitar 1. A plurality of electronic pickups 4 are mounted on the body 1*b*. The electronic pickups 4 can be inductive sensors, piezoelectric sensors, or the like to convert the vibrations of the strings to an electrical signal.

For example, the electronic pickups 4 can be an inductive sensor, such as a single coil or double coil pickup. Such an inductive sensor has a coil of wire wrapped around permanent magnet pole piece(s). The inductive sensor generates a magnetic field around the strings 5 and generates a voltage when the strings vibrate and change the magnetic field. Several types of inductive pickups are available including double coil (Humbucker) pickups, single coil pickups, P90 pickups, P-Bass pickups, jazz pickups, double stacked jazz pickups, hexaphonic pickups, etc.

In another example, the electronic pickups 4 can be a piezoelectric sensor that detects vibrations of the strings 5 and the instrument 1. Such a piezoelectric sensor can typically be placed at the bridge 3 of the stringed instrument 1. In further examples, the electronic pickups 4 can include a microphone, a voice coil, or other sensor responsive to audio signals. In fact, the teachings of the present disclosure can use any suitable source of electronic signals to be used as sound input for an "electronic pickup" as described herein.

The pickups 4 and the electric signals they produce can be controlled using the analog electronic system 10 of the present disclosure, which is mounted on (or housed inside) the guitar's body 1*b*. The electric signals at the output jack 2 of the guitar 1 can pass through a cable 6 to signal processing equipment 7 and an amplifier 8.

Embodiments of the electronic system 10 of the present disclosure may provide for a user to mix any combination of pickups 4 (whether coil splitting through top, bottom, or both or series/parallel) at any time through use of a selector or toggle switch 12. The selector or toggle switch 12 may allow a desired one or more of multiple pickups 4 to be selected and placed in either a parallel or series configuration as described herein. Accordingly, multiple pickups 4 can be on at the same time and/or the user may blend in (or out) any percentage of any of the pickups 4 that the user wishes to create a large combination of tones. More specifically, a user may use a selector or toggle switch 12 to select a pickup type (whether coil splitting through top/North, both, or bottom/South or series/parallel wiring) and then identify whether the output should be on or off and/or what percentage of output (0-100%) should be utilized (such as through use of a blending knob 14 or other selection mechanism). Accordingly, through the use of the above-described selection mechanisms 12, 14, multiple pickups 4 can be "on" at the same time and/or the user may blend in (or out) any percentage of any of the pickups 4 that the user wishes to create a large combination of tones.

Embodiments of the electronic system 10 of the present disclosure may provide scalable wiring, and in some embodiments of the present disclosure, a minimum of two double coil (also known as Hum bucker) pickups 4 may be used. In an example, a guitar 1 may include a master volume knob V (500k Ohm potentiometer) and a master tone knob T (500k Ohm potentiometer). These potentiometers V, T may be utilized to control volume and tone for modifying the sound provided by the guitar 1 in embodiments of the present disclosure.

With each pickup 4, there may be a two-way or a three-way toggle switch 12 that may allow the user to select the tonal characteristics of the pickup 4 in question (i.e., coil splitting through North Coil only (North Single Coil) or South Coil only (South Single Coil); series/parallel through coils wired in series or wired in parallel). For example, the pickup 4 can be a dual coil pickup having a north coil and a south coil. A three-way switch 12 associated with the pickup 4 can be selectable between a first condition selecting the north coil only, a second condition selecting the south coil only, and a third condition selecting a series wiring of the north coil and the south coil. Alternatively, a two-way switch 12 associated with the pickup 4 can be selectable between a first condition selecting the north or south coil only and a second condition selecting a series wiring of the north coil and the south coil.

A blending knob 14 (e.g., potentiometer) or other similar selection mechanism may function as an off/on taper or blender of the electronic signals of the pickup 4. This may allow the user to blend in the sound from the pickup 4 anywhere from 0-100% to the final mix for the output signal. The potentiometers 14 can have a linear or logarithmic taper as desired.

Figure 2A:
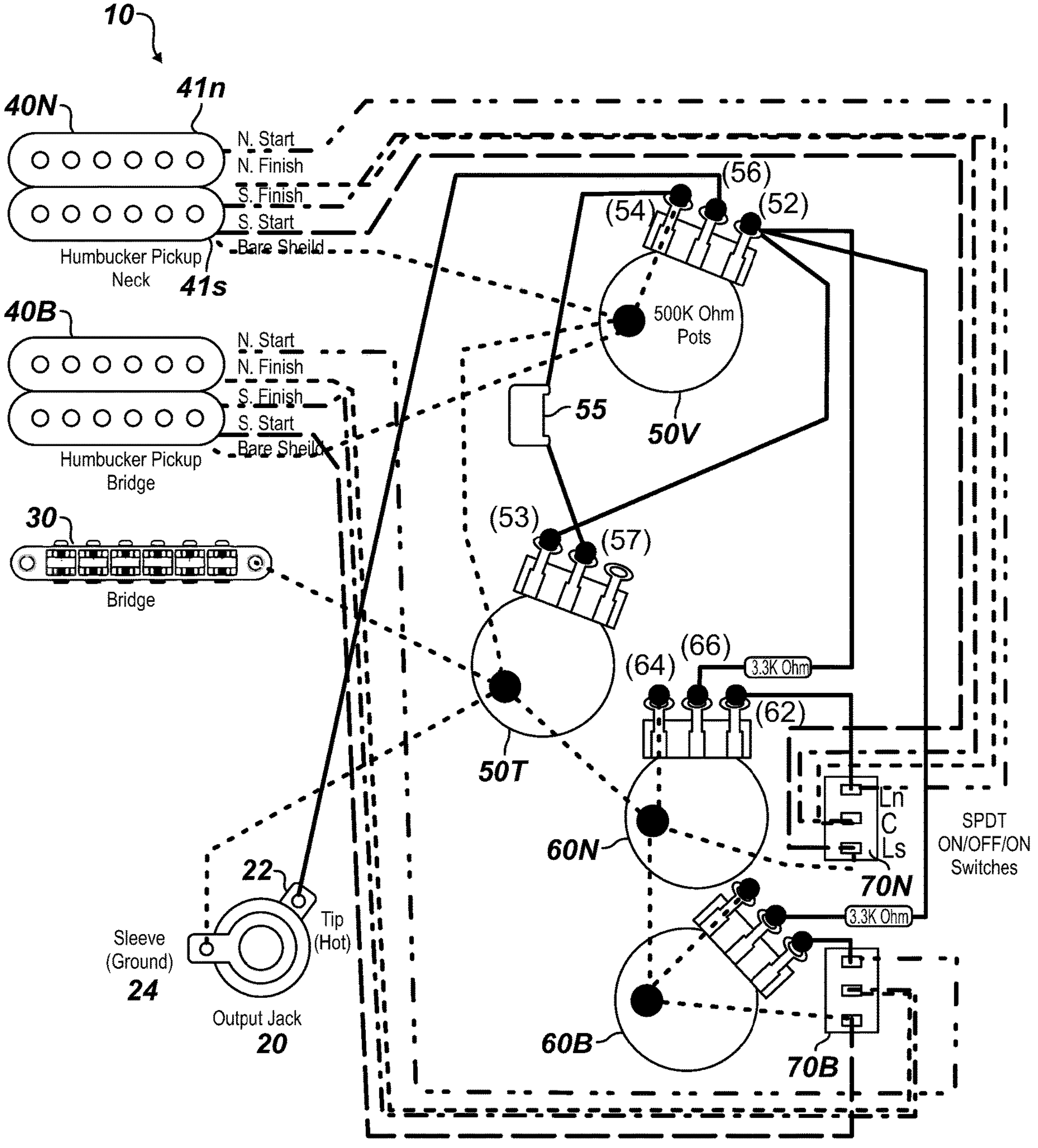
FIG. 2A depicts a wiring diagram for a pickup volume blending and coil splitting operation of the disclosed system according to an embodiment of the present disclosure.

FIG. 2A depicts a wiring diagram for an analog electronic system 10 of the present disclosure. The system 10 is arranged in a pickup volume blending and coil splitting operation according to an embodiment of the present disclosure. As depicted herein, a two-pickup version is provided, having a neck pickup 40N that is a double coil (North coil 41*n* and South coil 41*s*) pickup and having a bridge pickup 40B that is a double coil (North coil and South coil) pickup. A volume control 50V (e.g., a 500K Ohm potentiometer) is provided as a voltage divider to control the overall signal volume, and a tone control 50T (another 500K Ohm potentiometer) is provided as a variable resistor or a rheostat to control the overall signal tone.

Each of the pickups 40N, 40B is wired to a respective switching circuit 70N, 70B, which provide the coil splitting operation. In turn, each switching circuit 70N, 70B, is wired to a respective volume, blending, or taper circuit 60N, 60B, which provide the pickup volume blending operation. The output terminals (66) of both of the taper circuits 60N, 60B are wired to an input terminal (52) of the volume control potentiometer 50V, which is arranged as a voltage divider having a resistive element connected between the input terminal (52) and a ground terminal (54) with a movable wiper connected to an output terminal (56). The output terminal (56) of the volume control potentiometer 50V is wired to a hot contact 22 (tip) of an output jack 20.

For its part, the tone control potentiometer 50T is wired to the volume control potentiometer 50V to adjust the tone of the signal. The tone control potentiometer 50T is arranged as a variable resistor or a rheostat having a resistive element connected to an input terminal (53) with a movable wiper connected to an output terminal (57).

Looking in further detail, the start wire for the North coil 41*n* of the double coil neck pickup 40N and the start wire for the South coil 41*s* of the double coil neck pickup 40N each may be electrically connected to respective load terminals of a switching circuit 70N (e.g., a single pole double throw (SPDT) switch) for the neck pickup 40N. The SPDT switch 70N can be an on-off-on SPDT switch having a common terminal (C) and two load terminals (Ln, Ls). Meanwhile, the finish wires for the North and South coils 41*n*, 41*s* of the double coil neck pickup 40N are electrically connected to the common terminal (C) of the neck's SPDT switch 70N.

The electrical connection for the start wire for the North coil 41*n* may run from the neck's SPDT switch 70N to an input terminal (62) of a taper circuit 60N (e.g., a neck blending potentiometer). The neck blending potentiometer 60N is arranged as a voltage divider having a resistive element connected between the input terminal (62) and a ground terminal (64) with a movable wiper connected to an output terminal (66). (As an alternative, the electrical connection for the start wire for the North coil 41*n* may run from the neck's SPDT switch 70N to the output terminal (66), while the input terminal (62) connects to the input terminal (52) of the volume control 50V.) The electrical connection for the start wire for the South coil 41*s* may run from the neck's SPDT switch 70N to be grounded (i.e., being connected to the housing of the neck blending potentiometer 60N).

The SPDT switch 70N in a north "ON" condition electrically connects the North coil finish wire at the common terminal (C) to the north load terminal (Ln): this isolates the north coil 41*n* for blending by the neck blending potentiometer 60N. The SPDT switch 70N in a south "ON" condition electrically connects the South coil finish wire at the common terminal (C) to the south load terminal (Ls): this isolates the north coil 41*n* for blending by the neck blending potentiometer 60N. The SPDT switch 70N in an intermediate "OFF" condition does not connect the common terminal (C) to either load terminal (Ln, Ls) so that the neck pickup 40N operates as a dual coil pickup (i.e., humbucker) for blending by the neck blending potentiometer 60N.

Continuing with the neck pickup's electrical connection, the ground terminal (64) of the neck blending potentiometer 60N is grounded (i.e., being connected to the housing of the neck blending potentiometer 60N). The output terminal (66) is electrically connected to the input terminal (52) of the volume control potentiometer 50V. A resistor may be provided for this electrical connection between the volume control potentiometer 50V and the neck blending potentiometer 60N. The resistor can be 3.3K Ohm resistor. Other configurations may not require use of such a resistor.

Looking now at the bridge pickup 40B, its wiring to a switching circuit 70B and a taper circuit 60B is comparable to that of the neck pickup 40N. The start wire for the North coil 41*n* of the double coil bridge pickup 40B and the start wire for the South coil 41*s* of the double coil bridge pickup 40B each may be electrically connected to respective terminals of a switching circuit 70B (e.g., a second single pole double throw (SPDT) switch) for the bridge pickup 40B. The SPDT switch 70B can be an on-off-on SPDT switch having a common terminal (C) and two load terminals (Ln, Ls). (As an alternative, the electrical connection for the start wire for the North coil 41*n* may run from the bridge's SPDT switch 70B to the output terminal (66), while the input terminal (62) connects to the input terminal (52) of the volume control 50V.) Meanwhile, the finish wires for the North and South coils 41*n*, 41*s* of the double coil bridge pickup 40N are electrically connected to a common terminal (C) of the bridge's SPDT switch 70B. The SPDT switch 70B can be similarly configured as the other SPDT switch 70N.

The electrical connection for the start wire for the North coil 41*n* may run from the bridge's SPDT switch 70B to another taper circuit 60B (e.g., a bridge blending potentiometer) configured to control the blending of the bridge pickup's signals. The bridge blending potentiometer 60N is arranged as a voltage divider having a resistive element connected between the input terminal (62) and a ground terminal (64) with a movable wiper connected to an output terminal (66). The electrical connection for the start wire for the South coil 41*s* also may run from the SPDT switch 70B to be grounded (i.e., connected to the housing of the bridge blending potentiometer 60B).

Continuing with the bridge pickup's electrical connection, the ground terminal (64) of the bridge blending potentiometer 60B is grounded (i.e., being connected to the housing of the bridge blending potentiometer 60B). The output terminal (66) is electrically connected to the input terminal (52) of the volume control potentiometer 50V. Again, a resistor may be provided for this electrical connection between the volume control potentiometer 50V and the bridge blending potentiometer 60B. The resistor can be 3.3K Ohm resistor. Other configurations may not require use of such a resistor.

The guitar's bridge 30 is also depicted in FIG. 2 and may be grounded by a ground wire connected to the housing of the tone control 50T (e.g., potentiometer) or elsewhere. The grounding interconnects each of the housings of the potentiometers 50V, 50T, 60N, and 60B, and the grounding connects to the ground sleeve 24 provided on the output jack 20.

As is typical, the ground sleeve 24 is the inner, circular portion of output jack 20. The output jack 20 also may include the tip 22, which may be considered a hot contact of output jack 20. The hot contact 22 may be wired to an output terminal (56) of the volume control potentiometer 50V. The control potentiometers 50V, 50T may be connected to one another as well as depicted in FIG. 2A. A capacitor 55, such as a 0.0022F capacitor, may be provided between the ground terminal (54) of the volume control potentiometer 50V and the variable terminal (57) of the tone control potentiometer 50T.

The electronic system 10 of the present disclosure can be integrated into a stringed instrument, such as an electric guitar. For example, FIG. 2A shows the electronic system 10 integrated into the wiring and components of an electric guitar. Alternatively, the electronic system 10 can be implemented as a kit configured to retrofit an existing instrument. The kit can include interchangeable and interconnectable components to retrofit instruments having one or more electronic pickups. For example, the kit can include a circuit board, which can have integrated switches, potentiometers, and terminal connectors and can have preconfigured electrical traces. Original hardware (potentiometers, toggle switches and output jack) can be removed, requiring a few leads to be cut or unsoldered. All that is left inside a control cavity of the stringed instrument are the wires from the pickups and the bridge-ground wire. In another example, the kit can include a circuit board having preconfigured electrical traces and terminal connectors. The terminal connectors can allow pre-existing or replacement switches, potentiometers, and the like to be interconnected to the circuit board as the system 10 is retrofitted into a guitar. Moreover, the kit can include a full internal replacement of a guitar's electronics, in which case the kit can include one or more pickups, potentiometers, switches, circuit board, etc.

Figure 2B:
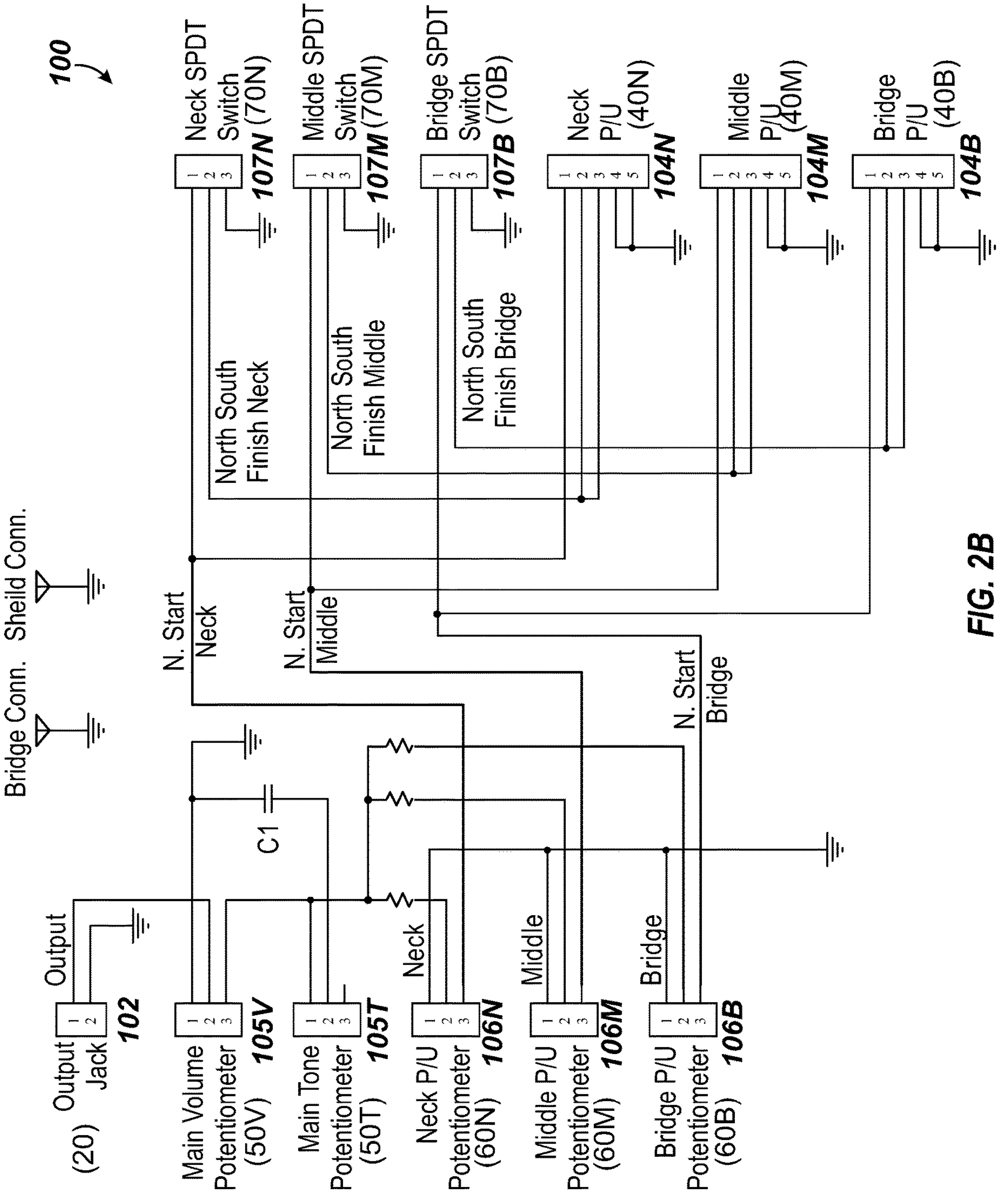
FIG. 2B depicts an analog circuit that may be utilized for configurations according to embodiments of the present disclosure.

For example, FIG. 2B depicts an analog circuit 100 for the electronic system 10. This circuit 100 can be implemented on a printed circuit board (not shown) to retrofit a guitar according to the present disclosure. Connectors 102, 104, 105, 106, and 107 are provided on the circuit 100 and are interconnected by electrical traces to achieve the signal routing of the present disclosure. Any suitable type of connector can be used, such as a quick connector, a solderless terminal, a wire-to-board connector, a fixed terminal block, etc.

Looking in more detail, a connector 102 is configured to connect to hot and ground wires from an output jack (20). The connector 102 has two terminals, a first terminal (1) is connected to a terminal of a connector 105V for the volume potentiometer (50V) and a second terminal (2) is connected to ground.

Connectors 105V, 105T provided on the circuit 100 are configured to connect to terminals of control potentiometers (50V, 50T) and are preconfigured with electrical connections to other parts of the circuit 100 according to the present disclosure. Connectors 106N, 106M, 106B provided on the circuit 100 are configured to connect to terminals of blending potentiometers (60B, 60N, 60B) for three double coiled pickups (neck, middle, and bridge) and are preconfigured with electrical connections to other parts of the circuit 100 according to the present disclosure. Connectors 107N, 107M, 107B similarly provided on the circuit 100 are configured to connect to terminals of SPDT switches (60B, 60N, 60B) for the three double coiled pickups (neck, middle, and bridge) and are preconfigured with electrical connections to other parts of the circuit 100 according to the present disclosure.

Finally, connectors 104N, 104M, 104B provided on the circuit 100 are configured to connect to leads for the three double coiled pickups (neck, middle, and bridge) and are preconfigured with electrical connections to other parts of the circuit 100 according to the present disclosure. These connectors 104N, 104M, 104B have five connection terminals to accommodate the several types of electronic pickups used for guitars, basses, and the like. For instance, some electronic pickups have two wires (e.g., a lead and a ground for a single coil pickup, or a hot lead and a ground lead for a Gibson style humbucker). Other electronic pickups have four wires (e.g., north start, north finish, south start, and south finish for a Fender system humbucker) or five wires (e.g., north start, north finish, south start, south finish, and a bare ground for some types of hum buckers).

This circuit 100 can be used to retrofit a guitar, which may have the pickups, some of the potentiometers, and the like already installed. New or replacement components can be included with the circuit 100 in the kit to retrofit the guitar.

Figure 3:
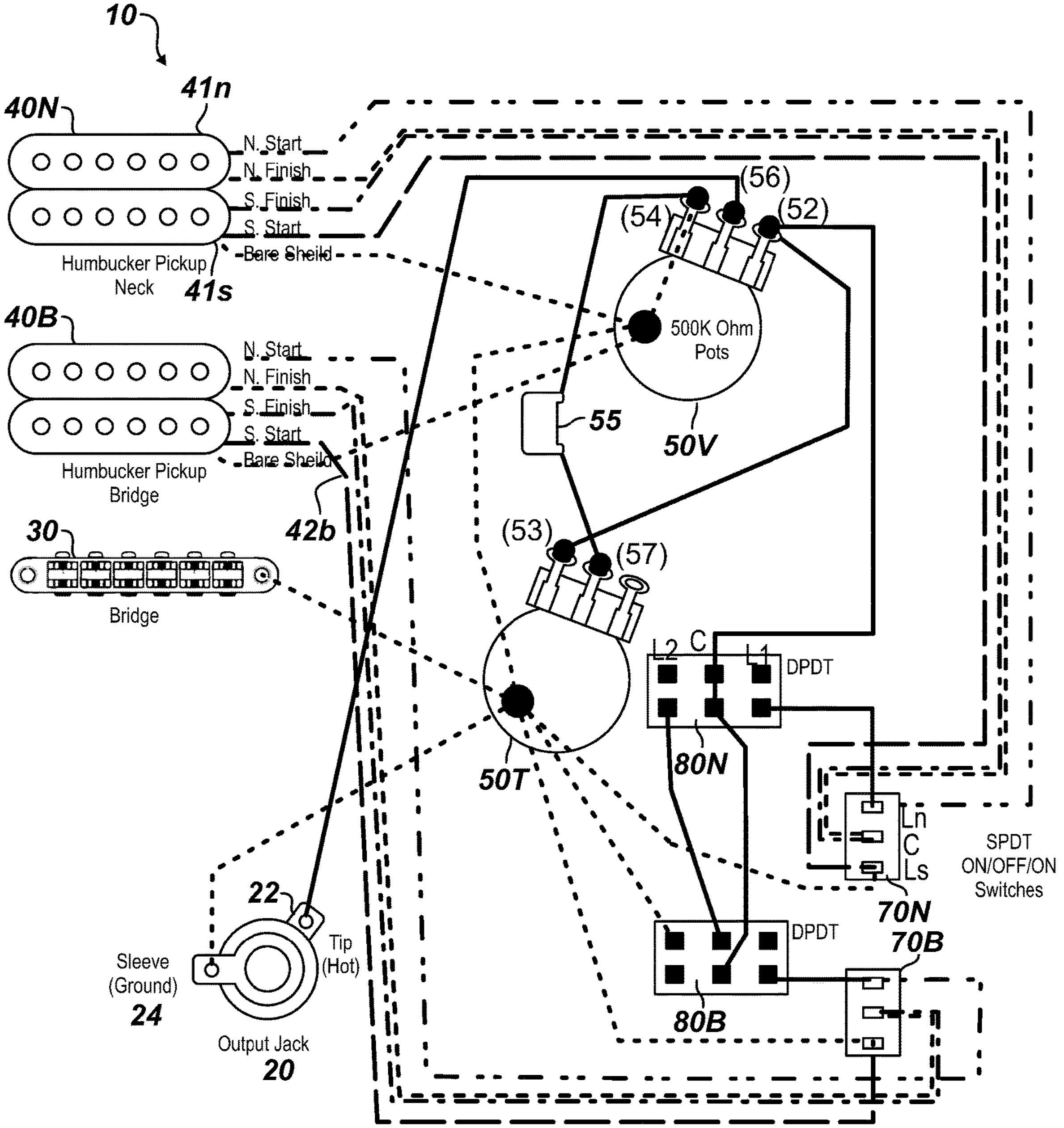
FIG. 3 depicts a wiring diagram for a pickup on/off toggle operation according to an embodiment of the present disclosure.

FIG. 3 depicts a wiring diagram for an analog electronic system 10 of the present disclosure. The system 10 is arranged in a pickup on/off toggle and a coil splitting operation according to an embodiment of the present disclosure. As depicted herein, a two-pickup version is provided, having a neck pickup 40N that is a double coil (North coil 41*n* and South coil 41*s*) pickup and, having a bridge pickup 40B that is a double coil (North coil 41*n* and South coil 41*s*) pickup. A volume control 50V (e.g., a 500K Ohm potentiometer) is provided as a voltage divider to control the overall signal volume, and a tone control 50T (another 500K Ohm potentiometer) is provided as a rheostat to control the overall signal tone.

Each of the pickups 40N, 40B is wired to a respective switching circuit 70N, 70B, which provide the coil splitting operation. As before, the switching circuit 70N, 70B can each be an on-off-on single pole double throw (SPDT) switch having a common terminal (C) and two load terminals (Ln, Ls). In turn, each switching circuit 70N, 70B is wired to a taper circuit 80N, 80B, which provide the pickup on/off toggle operation as a form of taper or blending. In the present configuration, the taper circuits 80N, 80B can each include an on-on double pole double throw (DPDT) switch having common terminals (C) and two load terminals (L1, L2) for the dual poles. Common terminals (C) of both of the DPDT switches 80N, 80B are wired to an input terminal (52) of the volume control potentiometer 50V. For its part, the tone control potentiometer 50T is wired to the volume control potentiometer 50V to adjust the tone of the signal. Finally, the output terminal (56) of the volume control potentiometer 50V is wired to a hot contact 22 (tip) of an output jack 20.

Looking in further detail, the start wire for the North coil 41*n* of the double coil neck pickup 40N and the start wire for the South coil 41*s* of the double coil neck pickup 40N each may be electrically connected to respective terminals of a switching circuit 70N (e.g., a single pole double throw (SPDT) switch) for the neck pickup 40N. Meanwhile, the finish wires for the North and South coils 41*n*, 41*s* of the double coil neck pickup 40N are electrically connected to a common terminal (C) of the neck's SPDT switch 70N.

The electrical connection for the start wire for the North coil 41*n* may run from the neck's SPDT switch 70N to a load terminal (L1) of the DPDT switch 80N. The electrical connection for the start wire for the South coil 41*s* may run from neck's SPDT switch 70N to be grounded (i.e., being connected to the housing of the tone control potentiometer 50T).

Continuing with the neck pickup's electrical connection, the common terminals (C) of the neck's DPDT switch 80N of the two poles are electrically connected together. The common terminals (C) are electrically connected to the input terminal (52) of the volume control potentiometer 50V and are electrically connected to one of the common terminal (C) for the south pole of the other DPDT switch 80B.

Looking now at the bridge pickup 40B, its wiring to a switching circuit 70B and a taper circuit 80B is comparable to that of the neck pickup 40N. The North start wire for the North coil 41*n* of the double coil pickup for the bridge pickup 40B and the South start wire for the South coil 41*s* of the double coil pickup for the bridge pickup 40B each may be electrically connected to respective terminals of the SPDT switch 70B for the bridge pickup 40B. Meanwhile, the finish wires for the North and South coils 41*n*, 41*s* of the double coil bridge pickup 40B are electrically connected to a common terminal © of the bridge's SPDT switch 70B. The electrical connection for the North start wire for the North coil 41*n* may run from the bridge's SPDT switch 70B to a load terminal (L1) of the south pole of the DPDT switch 80B for the bridge pickup 40B.

Continuing with the bridge pickup's electrical connection, the common terminals (C) for the north pole of the DPDT switch 80B connects to the second load terminal (L2) of the south pole of the neck's DPDT switch 80B. Finally, a load terminal (L2) of the north pole of the DPDT switch 80B is grounded (i.e., being connected to the housing of the tone control potentiometer 50T).

The guitar's bridge 30 is also depicted in FIG. 3 and may be grounded by a ground wire connected to the housing of the tone control potentiometer 50T. The grounding interconnects each of the housings of the potentiometers 50V, 50T to the ground sleeve 24 provided on the output jack 20, as a circuit ground.

As is typical, the ground sleeve 24 is the inner, circular portion of output jack 20. The output jack 20 also may include the tip 22, which may be considered a hot contact of output jack 20. The hot contact 22 may be wired to an output terminal (56) of the volume control potentiometer 50V. The control potentiometers 50V, 50T may be connected to one another as well as depicted in FIG. 3. A capacitor 55, such as a 0.0022 F capacitor, may be provided between the ground terminal (54) of the volume control potentiometer 50V and the variable terminal (57) of the tone control potentiometer 50T.

Although FIG. 3 shows this configuration of the electronic system 10 integrated into the wiring and components of an electric guitar, it will be appreciated that elements of the electronic system 10 can be implemented as an analog circuit on a printed circuit board (not shown) to retrofit a guitar similar to the implementation of FIG. 2B.

Figure 4A:
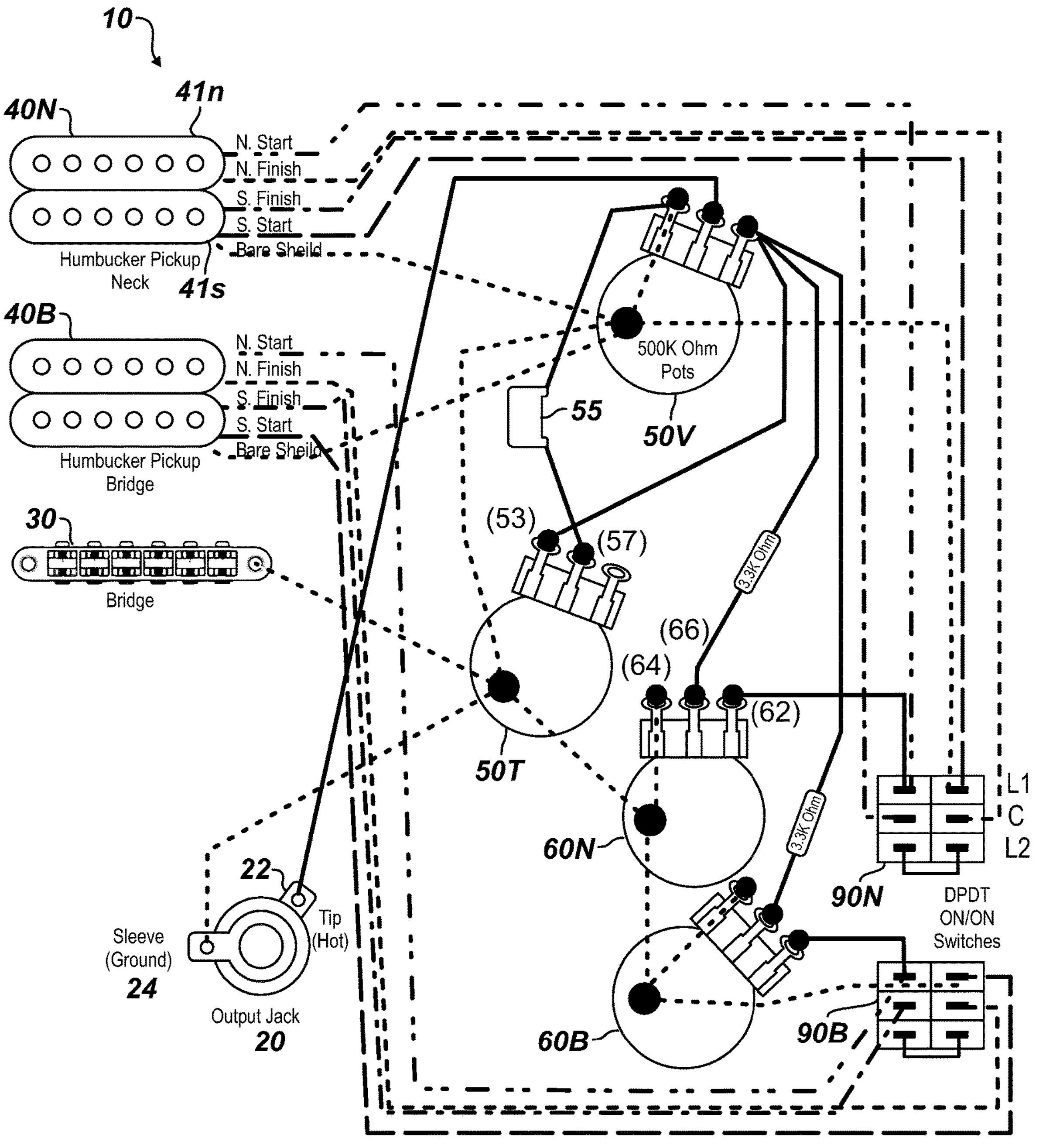
FIG. 4A depicts a wiring diagram of a series/parallel operation according to an embodiment of the present disclosure.

FIG. 4A depicts another wiring diagram for an analog electronic system 10 of the present disclosure. The system 10 is arranged in a series/parallel operation according to an embodiment of the present disclosure. As depicted herein, a two-pickup version is provided, having a neck pickup 40N that is a double coil (North coil 41*n* and South coil 41*s*) pickup and having a bridge pickup 40B that is a double coil (North coil and South coil) pickup. A volume control 50V (e.g., a 500K Ohm potentiometer) is provided as a voltage divider to control the overall signal volume, and a tone control 50T (another 500K Ohm potentiometer) is provided as a rheostat to control the overall signal tone.

Each of the pickups 40N, 40B is wired to a respective switching circuit 90N, 90B, which provide the series/parallel operation. In turn, each switching circuit 90N, 90B is wired to a respective volume, blending, or taper circuit 60N, 60B, which provide the pickup volume blending operation. The output terminals 66 of both of the taper circuits 60N, 60B are wired to an input terminal (52) of the volume control potentiometer 50V. For its part, the tone control potentiometer 50T is wired to the volume control potentiometer 50V to adjust the tone of the signal. Finally, the output terminal (56) of the volume control potentiometer 50V is wired to a hot contact 22 (tip) of an output jack 20.

Looking in further detail, the start wire for the North coil 41*n* of the double coil neck pickup 40N and the start wire for the South coil 41*s* of the double coil neck pickup 40N each may be electrically connected to respective load terminals (L1) of the dual poles for a switching circuit 90N (e.g., an on-on double pole double throw (DPDT) switch) for the neck pickup 40N. Meanwhile, the finish wires for the North and South coils 41*n*, 41*s* of the double coil neck pickup 40N are electrically connected to respective common terminals (C) of the neck's DPDT switch 90N.

The electrical connection for the start wire for the North coil 41*n* may then run from one pole's load terminal (L1) of the DPDT switch 90N to the input terminal (62) of the neck blending potentiometer 60N, and the start wire for the South coil 41*s* may then run from the other pole's load terminal (L1) of the DPDT switch 90N to be grounded (i.e., being connected to the grounded housing of the volume control potentiometer 50V). The other load terminals (L2) for the two poles of the DPDT switch 90N are interconnected by a jumper.

Continuing with the neck pickup's electrical connection, the ground terminal (64) of the neck blending potentiometer 60N is grounded (i.e., being connected to the housing of the neck blending potentiometer 60N). The output terminal (66) is electrically connected to the input terminal (52) of the volume control potentiometer 50V. A 3.3K Ohm resistor may be provided for this electrical connection between the volume control potentiometer 50V and the neck blending potentiometer 60N.

Looking now at the bridge pickup 40B, its wiring to a switching circuit 90B and a taper circuit 60B is comparable to that of the neck pickup 40N. The start wire for the North coil 41*n* of the double coil bridge pickup 40B and the start wire for the South coil 41*s* of the double coil bridge pickup 40B each may be electrically connected to respective load terminals (L1) of the dual poles for a switching circuit 90B (e.g., an on-on DPDT switch). Meanwhile, the finish wires for the North and South coils 41*n*, 41*s* of the double coil bridge pickup 40B are electrically connected to respective common terminals (C) of the bridge's DPDT switch 90B.

The electrical connection for the start wire for the North coil 41*n* may run from one pole's load terminal (L1) of the DPDT switch 90B to the input terminal (62) of the bridge blending potentiometer 60B. The start wire for the South coil 41*s* also may run from the other pole's load terminal (L1) of the DPDT switch 90B to be grounded (i.e., being connected to the grounded housing of the potentiometer 60B). The other load terminals (L2) for the two poles of the DPDT switch 90B are interconnected by a jumper.

Continuing with the bridge pickup's electrical connection, the ground terminal (64) of the bridge blending potentiometer 60B is grounded (i.e., being connected to the housing of the bridge blending potentiometer 60B). The output terminal (66) is electrically connected to the input terminal (52) of the volume control potentiometer 50V. Again, a 3.3K Ohm resistor may be provided for this electrical connection between the volume control potentiometer 50V and the bridge blending potentiometer 60B.

The guitar's bridge 30 is also depicted in FIG. 4A and may be grounded by a ground wire connected to the housing of the tone control potentiometer 50T or elsewhere. The grounding interconnects each of the housings of the potentiometers 50V, 50T, 60N, 60B to the ground sleeve 24 provided on the output jack 20.

The hot contact 22 of the output jack 20 may be wired to the volume control potentiometer 50V. A capacitor 55, such as a 0.0022 F capacitor, may be provided and connected between the ground terminal (54) of the volume control potentiometer 50V and the variable terminal (57) of the tone control potentiometer 50T.

Figure 4B:
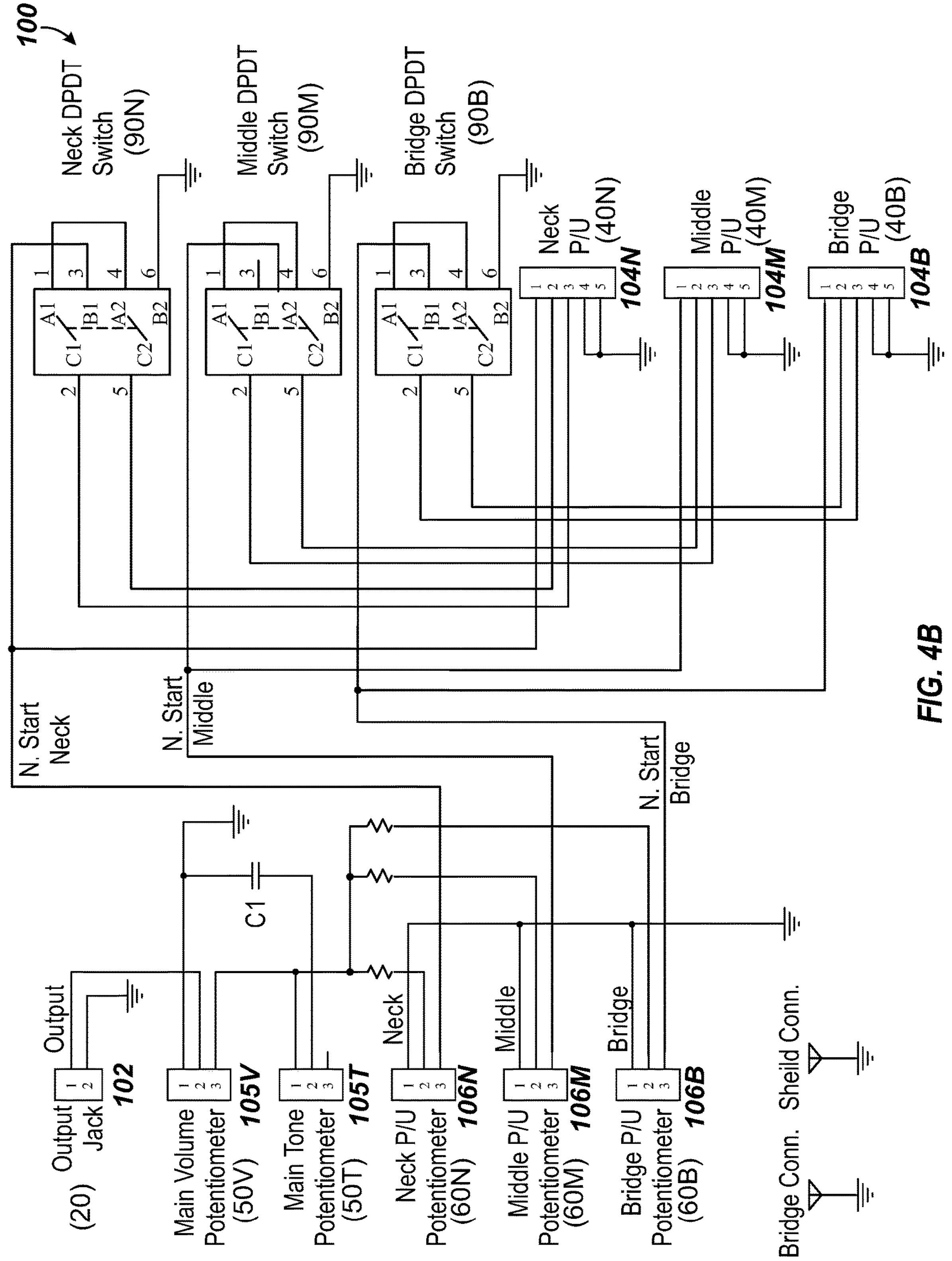
FIG. 4B depicts an analog circuit that may be utilized for configurations according to embodiments of the present disclosure.

As noted, the electronic system 10 of the present disclosure can be implemented as a circuit board having preconfigured electrical traces and terminal connectors. For example, FIG. 4B depicts a circuit 100 for the electronic system 10. This circuit 100 can be implemented on a printed circuit board (not shown) to retrofit a guitar according to the present disclosure. Connectors 102, 104, and 105 are provided on the circuit 100 and are interconnected by electrical traces to achieve the signal routing of the present disclosure. Any suitable type of connector can be used, as noted herein.

Looking in more detail, a connector 102 is configured to connect to the hot and ground wires from an output jack (20). The connector 102 has two terminals, a first terminal (1) is connected to a terminal of a connector 105V for the volume potentiometer (50V) and a second terminal (2) is connected to ground.

Connectors 105V, 105T provided on the circuit 100 are configured to connect to terminals of control potentiometers (50V, 50T) and are preconfigured with electrical connections to other parts of the circuit 100 according to the present disclosure. Connectors 106N, 106M, 106B provided on the circuit 100 are configured to connect to terminals of blending potentiometers (60N, 60M, 60B) for three double coiled pickups (neck, middle, and bridge) and are preconfigured with electrical connections to other parts of the circuit 100 according to the present disclosure.

In this circuit 100, the DPDT switches (90N, 90M, 90B) for the three double coiled pickups (neck, middle, and bridge) are preinstalled on the circuit 100 and are preconfigured with electrical connections to other parts of the circuit 100 according to the present disclosure. As an alternative, the circuit 100 can instead include connectors (not shown) for connection to separate DPDT switches (90N, 90M, 90B). Finally, connectors 104N, 104M, 104B provided on the circuit 100 are configured to connect to leads for the three double coiled pickups (neck, middle, and bridge) and are preconfigured with electrical connections to other parts of the circuit 100 according to the present disclosure.

Figure 4C:
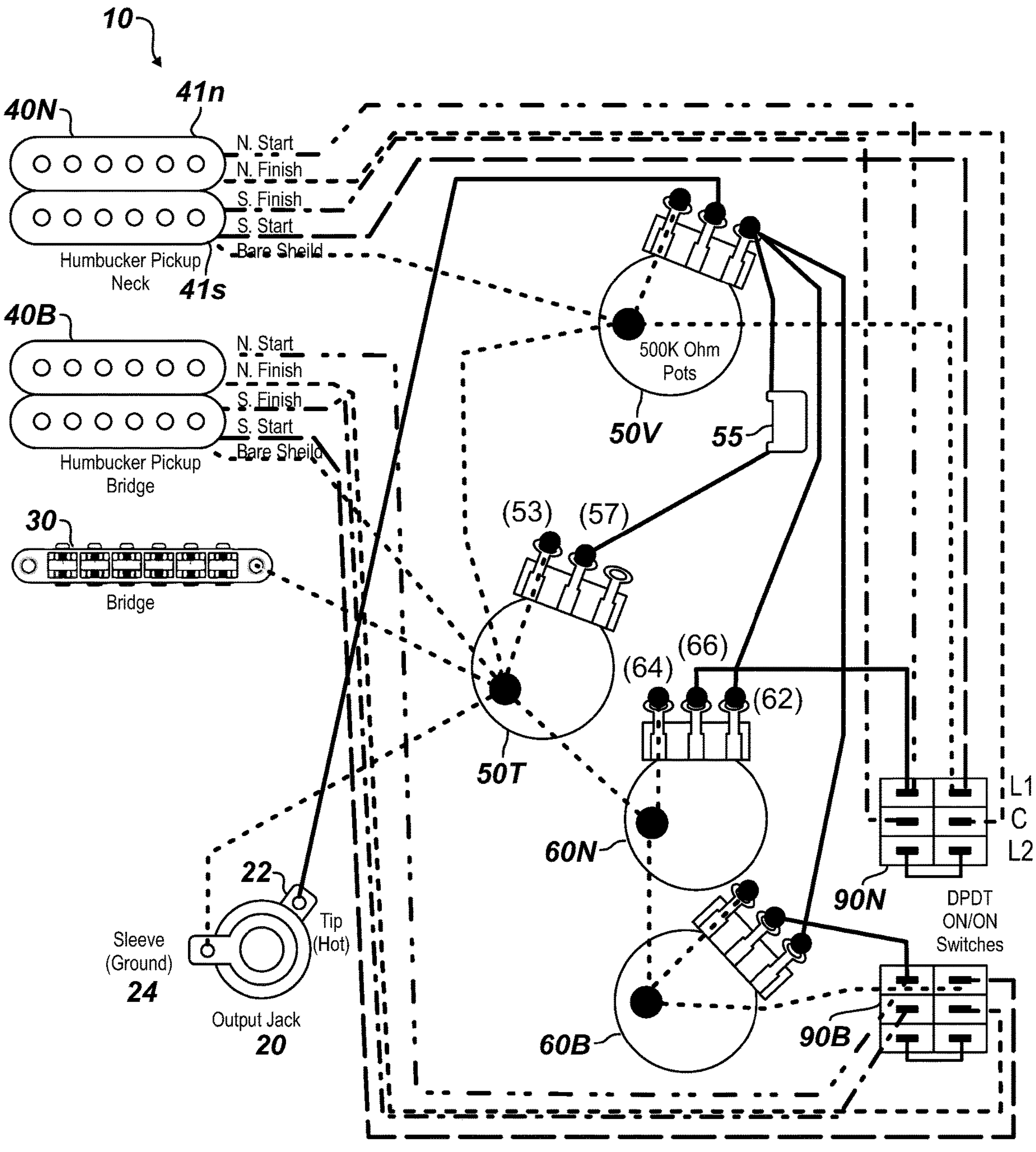
FIG. 4C depicts another wiring diagram of a series/parallel operation according to an embodiment of the present disclosure.
Figure 4D:
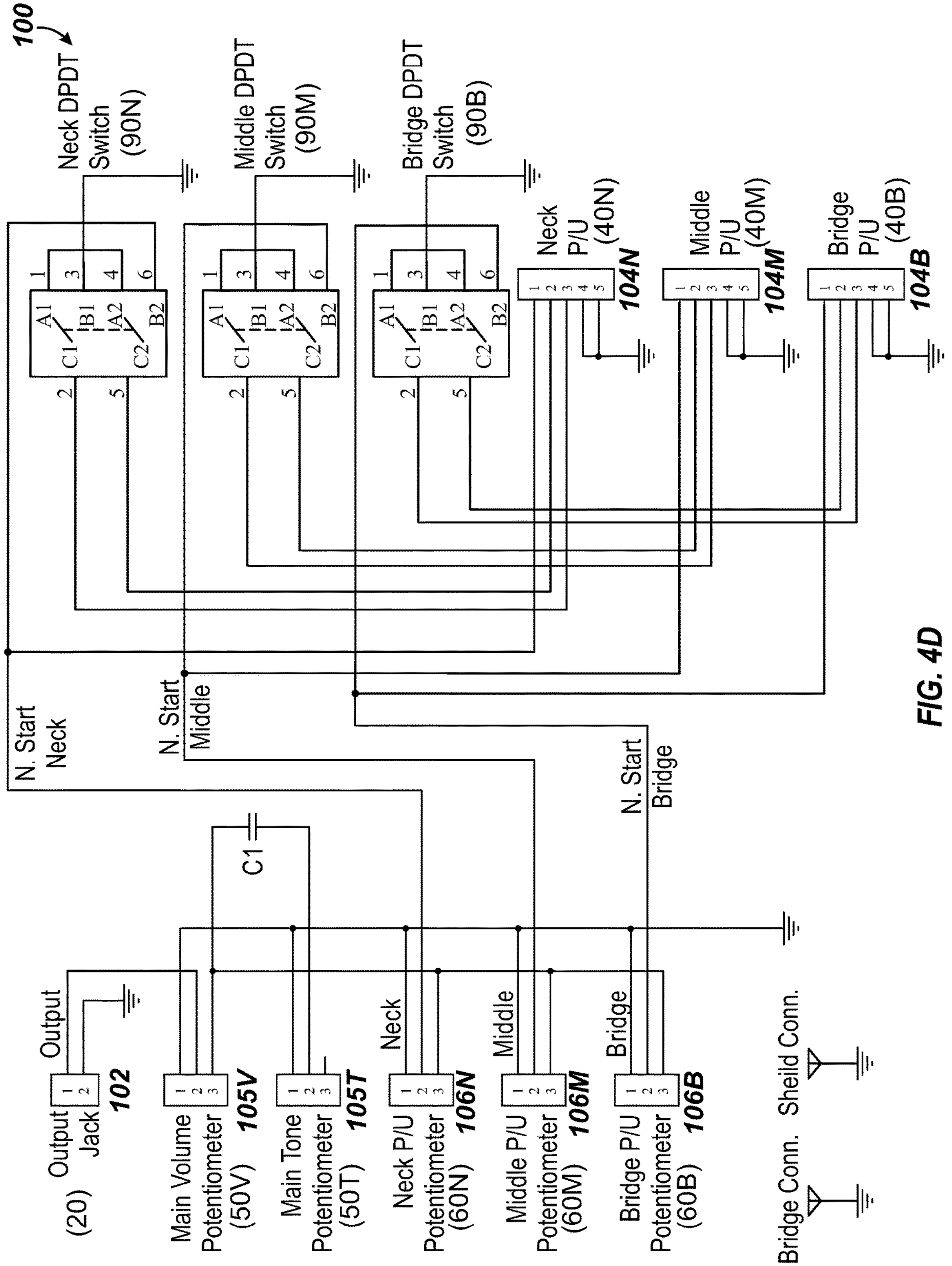
FIG. 4D depicts another analog circuit that may be utilized for configurations according to embodiments of the present disclosure.

Looking at an alternative arrangement, FIG. 4C depicts another wiring diagram of a series/parallel operation according to an embodiment of the present disclosure, and FIG. 4D depicts another analog circuit that may be utilized for configurations according to embodiments of the present disclosure. This arrangement is similar to that disclosed with reference to FIGS. 4A-4B except that alternative wiring is performed and the use of resistors is eliminated. In contrast to the previous wiring, this arrangement connects the input terminals (62) of the blending potentiometers 60N, 60B to the input terminal (62) of the volume control potentiometer 50V, and the North start wires of the pickups 40N, 40B connect from the loads (L1) of the DPDT switches 90N, 90B to the output terminal (66) of the respective blending potentiometers 60N, 60B. Additionally, the capacitor 55 connects from the input terminal (52) of the volume control potentiometer 50V to the output terminal (57) of the tone control potentiometer 50T, and the ground terminal (53) of the tone control potentiometer 50T connects to circuit ground (e.g., grounded to the housing).

In an embodiment of the present disclosure, a user may use a configuration similar to that depicted below in order to create the multiple tones. If a Gibson Les Paul Rock sound is required, the user may set the configuration to the following:

Neck Pickup Toggle Switch: —
Neck Pickup Knob: Off (0%)
Middle Pickup Toggle Switch: —
Middle Pickup Knob: Off (0%)
Bridge Pickup Toggle Switch: Middle
Bridge Pickup Knob: On (100%)

If a lead guitar tone was needed, such as with a Fender Stratocaster, the user may set the configuration to the following:

Neck Pickup Toggle Switch: Down
Neck Pickup Knob: On (100%)
Middle Pickup Toggle Switch: —
Middle Pickup Knob: Off (0%)
Bridge Pickup Toggle Switch: —
Bridge Pickup Knob: Off (0%)

If a combination of both the tones above is desired, the user may set the configuration to the following:

Neck Pickup Toggle Switch: Down
Neck Pickup Knob: On (100%)
Middle Pickup Toggle Switch: —
Middle Pickup Knob: Off (0%)
Bridge Pickup Toggle Switch: Middle
Bridge Pickup Knob: On (100%)

If this combination ended up sounding too bright, the user may dial down one of the pickups using the following configuration:

Neck Pickup Toggle Switch: Down
Neck Pickup Knob: On (25%)
Middle Pickup Toggle Switch: —
Middle Pickup Knob: Off (0%)
Bridge Pickup Toggle Switch: Middle
Bridge Pickup Knob: On (100%)

Another application of use according to embodiments of the present disclosure may be at a live concert. A guitarist uses various effects and volume pedals to achieve different tonal changes live in real time. By giving the ability to turn on or off other pickup tones on the fly in real time, a guitarist could easily change their tone without the need of other external effects. One example would be if a guitarist is playing a Rhythm guitar part using configuration:

Neck Pickup Toggle Switch: —
Neck Pickup Knob: Off (0%)
Middle Pickup Toggle Switch: —
Middle Pickup Knob: Off (0%)
Bridge Pickup Toggle Switch: Middle
Bridge Pickup Knob: On (100%)

Once the song needs a change in tone for the guitar (i.e., a solo, lead part, or just something that needs to cut through the mix), the guitarist could just turn on another pickup slightly in order to color the tone a little more so that it will cut though the mix. A configuration such as the following may achieve this tone:

Neck Pickup Toggle Switch: Down
Neck Pickup Knob: On (25%)
Middle Pickup Toggle Switch: —
Middle Pickup Knob: Off (0%)
Bridge Pickup Toggle Switch: Middle
Bridge Pickup Knob: On (100%)

As reflected in the above embodiments, configurations according to embodiments of the present disclosure are not limited to on/off output. Rather, values from 0-100% of any pickup may be blended using any configuration of the pickup. This may provide a variety of new tonal options that have not been previously possible.

Figure 5:
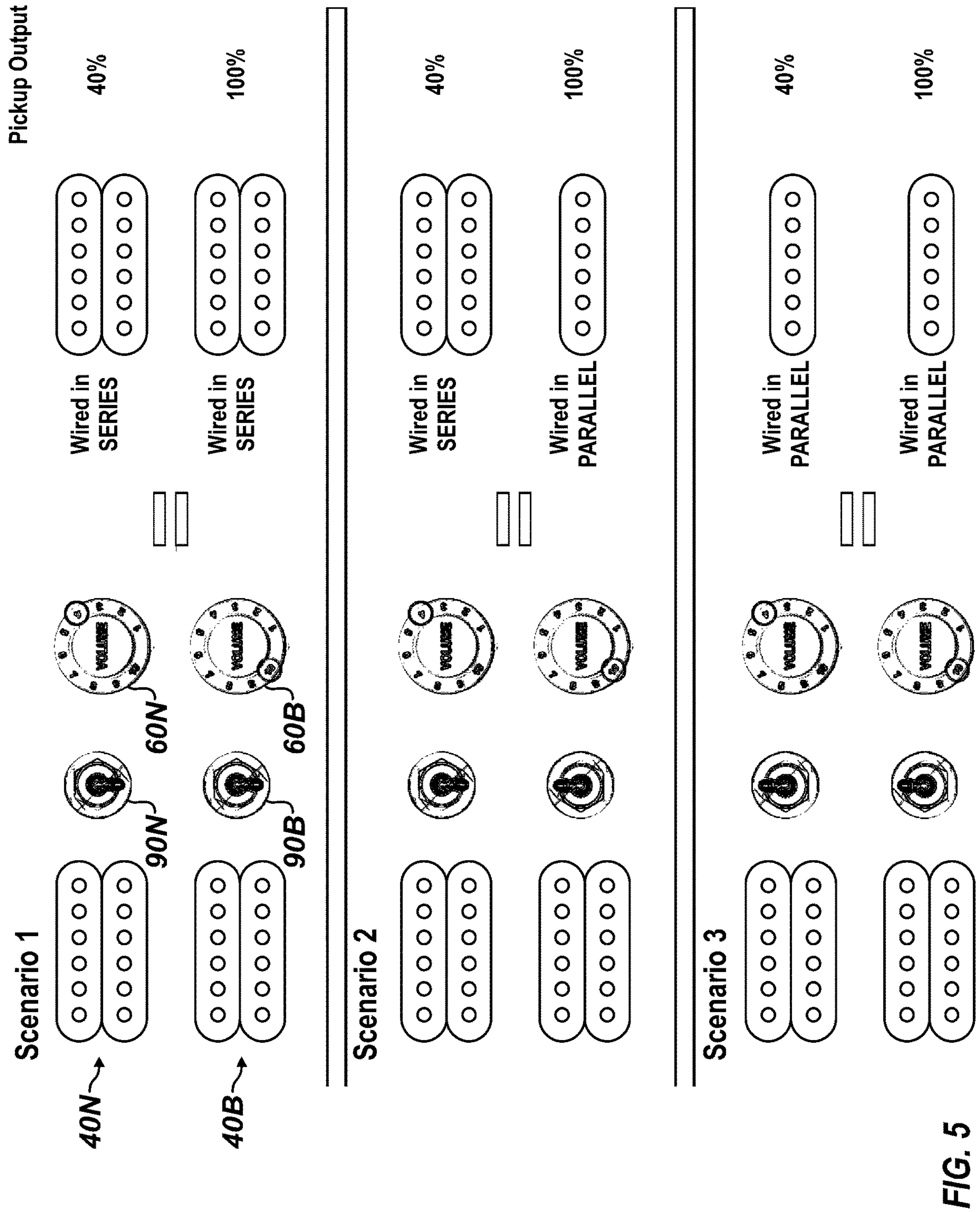
FIG. 5 depicts different wiring scenarios according to an embodiment of the present disclosure.

FIG. 5 depicts different wiring scenarios according to an embodiment of the present disclosure. In each of these scenarios, a pickup selector or toggle switch 90N, 90B may be provided along with an output knob 60N, 60B for each pickup 40N, 40B to be provided on the guitar/bass. The output knob 60N, 60B may be used for adjustment of volume and/or tone of the respective pickup 40N, 40B according to embodiments of the present disclosure. Volume control may allow a user to vary the volume of the instrument while tone control may allow the user to vary the tone of the instrument.

As reflected herein, there may be some scenarios where series and/or parallel wiring may be utilized. Series wiring refers to standard wiring for double coil pickups 40N, 40B (i.e., two single coil pickups wired together in series to create a tone). Parallel wiring splits a double coil pickup 40N, 40B into two single coil pickups but wires them together in parallel, essentially making it sound like one single coil pickup but at twice the volume. Scenario 1 depicts two pickups 40N, 40B, each wired in series but one with a pickup output of 40% and the other having a pickup output of 100%. Scenario 2 depicts two pickups 40N, 40B, one wired in series having a pickup output of 40% and the other wired in parallel having a pickup output of 100%. Scenario 3 depicts two pickups 40N, 40B, each wired in parallel but one with a pickup output of 40% and the other having a pickup output of 100%.

Figure 7A:
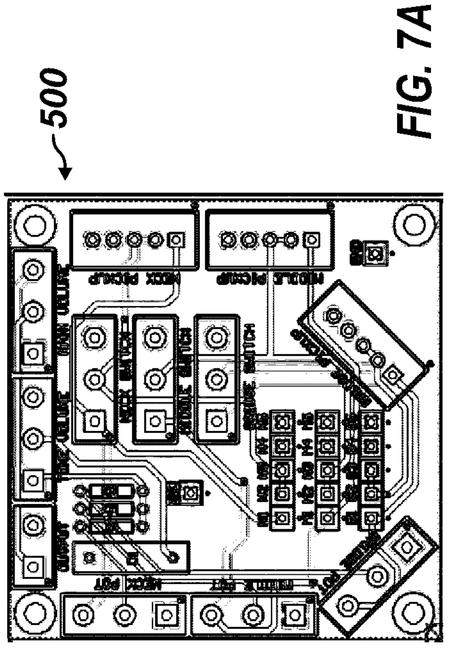
FIGS. 7A-7B depict a printed circuit board (PCB) for coil splitting operation to replace wiring configurations according to an embodiment of the present disclosure.
Figure 6A:
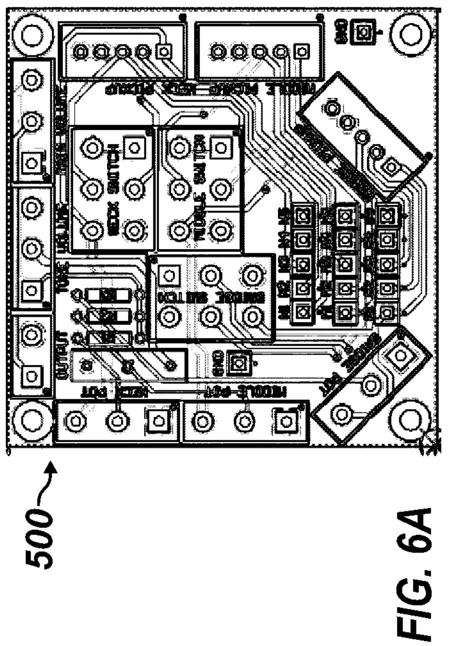
FIGS. 6A-6B depict a printed circuit board (PCB) for series/parallel operation to replace wiring configurations according to an embodiment of the present disclosure.
Figure 7B:
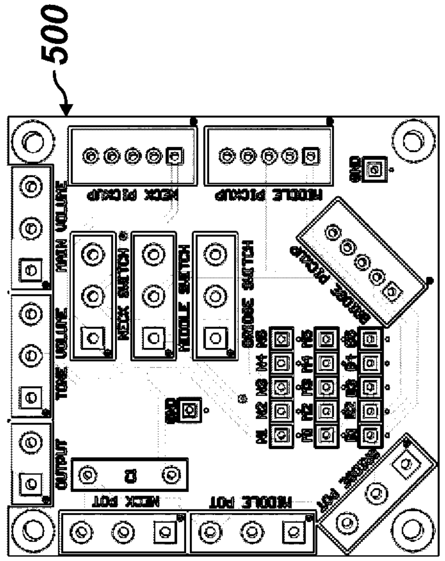
Figure 6B:
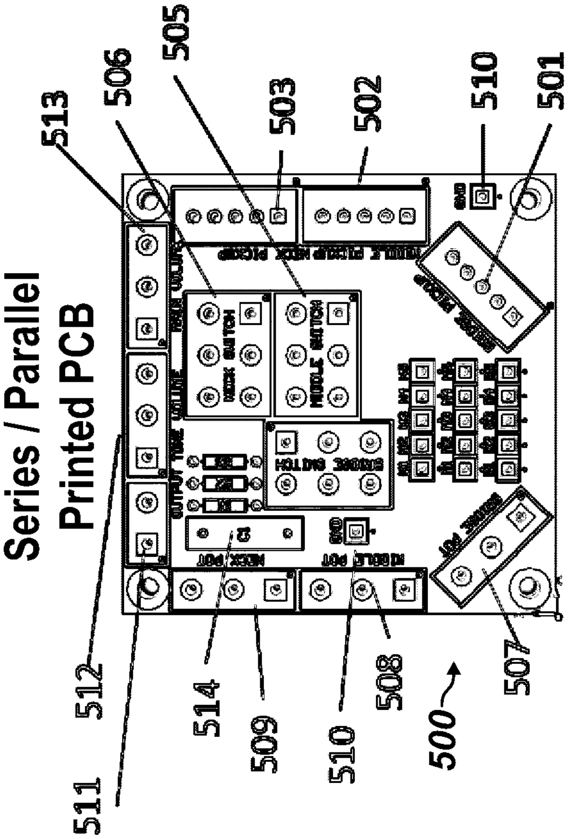

As noted previously, FIGS. 2A, 3, 4A depict integrated wiring that may be utilized for configurations according to embodiments of the present disclosure. Meanwhile, FIGS. 2B and 4B show circuits that may be utilized for configurations according to embodiments of the present disclosure. Accordingly, it should be appreciated that printed circuit boards (PCBs) may be used in place of wiring. FIGS. 6A-6B and FIGS. 7A-7B depict examples of printed circuit boards (PCBs) 500 to replace the wiring of FIGS. 2A, 3, 4A according to an embodiment of the present disclosure. As depicted herein, a modular design may be provided using a PCB 500 and screw terminal quick disconnects (solderless). More specifically, FIGS. 6A-6B depict a series-to-parallel arrangement for a PCB 500 according to an embodiment of the present disclosure. FIGS. 7A-7B depicts a coil splitting arrangement for a PCB 500 according to an embodiment of the present disclosure. The connections between the various components on the PCBs 500 are depicted in the traces shown in FIGS. 6A-6B and 7A-7B. While certain connections are depicted herein, there may be other connections without departing from the present disclosure.

As labeled in FIG. 6B, each of the PCB's 500 of FIGS. 6A-6B and 7A-7B may include bridge pickup contacts 501, middle pickup contacts 502, and neck pickup contacts 503. The PCB's also may include bridge switch contacts 504, middle switch contacts 505, and neck switch contacts 506.

The PCB's 500 may further include bridge potentiometer contacts 507, middle potentiometer contacts 508, and neck potentiometer contacts 509. At least one ground contact (GND) 510 also may be provided along with output contacts 511, tone volume contacts 512, main volume contacts 513, and capacitor contacts 514 in embodiments of the present disclosure. Test pads N1-5, M1-5 and B1-5 may allow for quick testing of the continuity between each of the wires for each pickup (i.e., neck (N1-N5), middle (M1-M5), and bridge (B1-135). Resistor contacts R1-R3 represent contacts for the resistors needed for each pickup: R1 for neck, R2 for middle, and R3 for bridge.

Figure 8A:
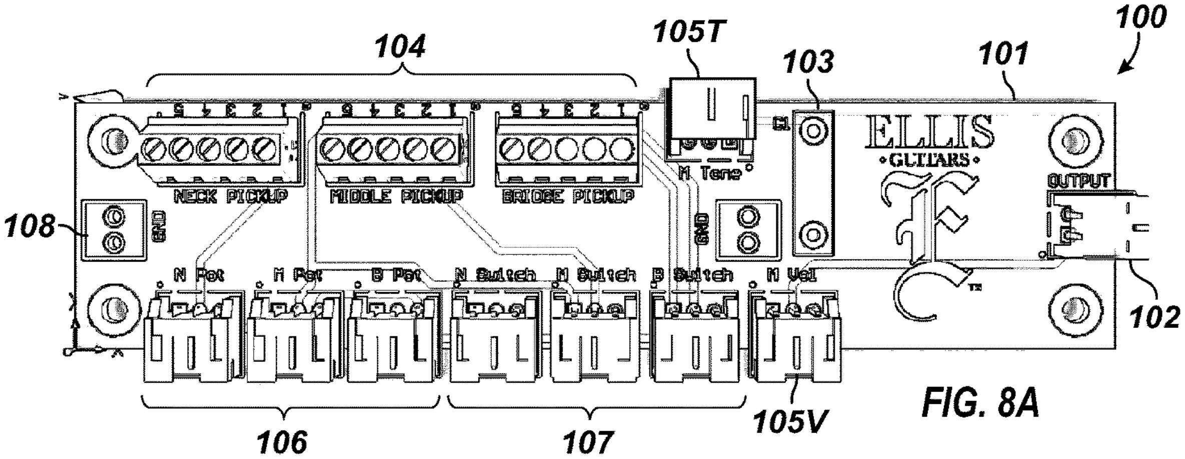
FIGS. 8A-8B depict a modular analog circuit for an electronic system of the present disclosure that can be integrated into a string instrument having up to three pickups.
Figure 8B:
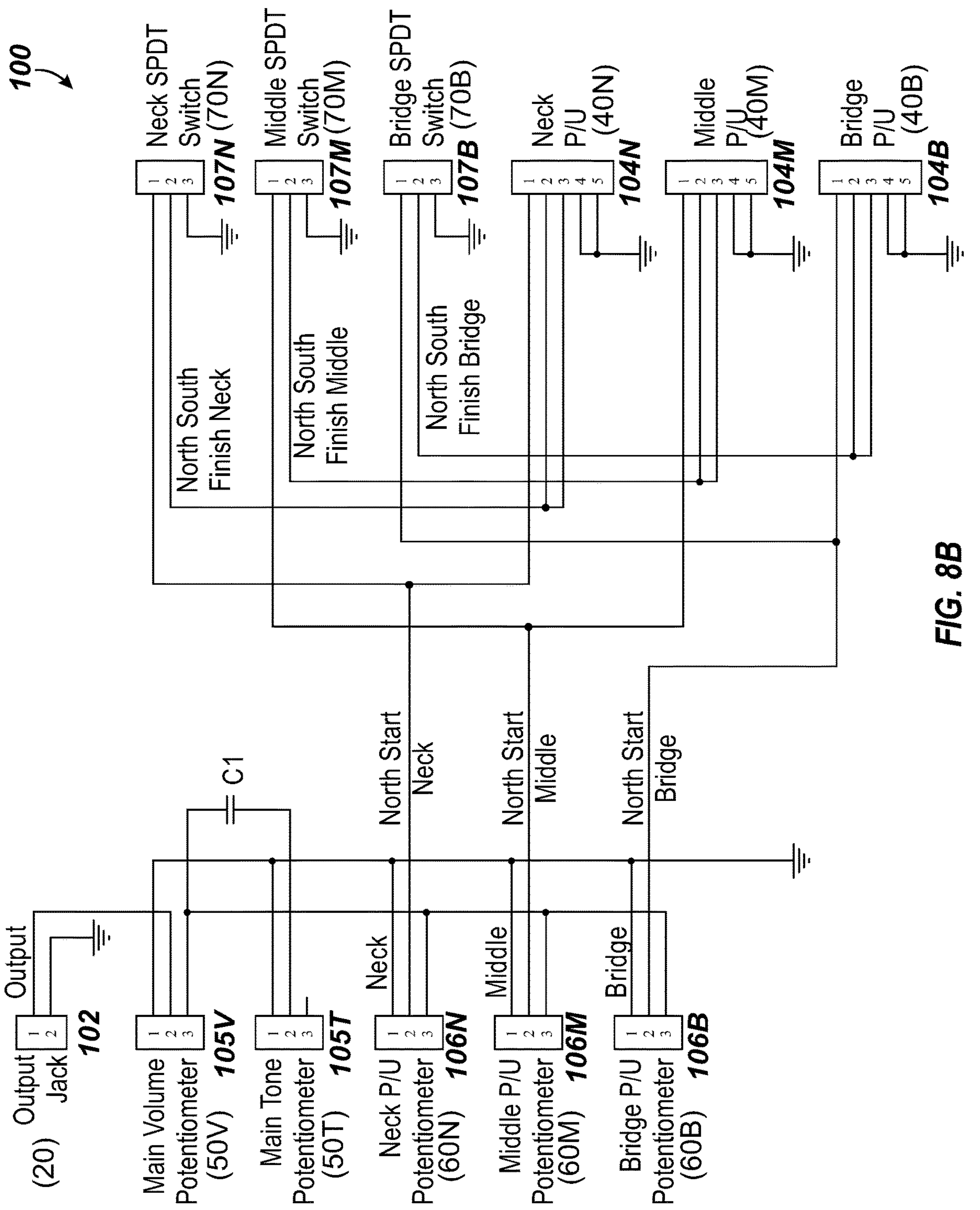

FIGS. 8A-8B depict a modular analog circuit 100 for the electronic system 10 that can be integrated into a string instrument having up to three pickups. The pickups can be of any type, including single coil, double coil (humbucker), piezoelectric, etc., as long as each pickup has at least two leads (i.e., at least a hot lead and a ground lead). The modular circuit 100 can accommodate any combination of the three pickups, and the modular circuit 100 can be used with or without volume and tone controls. The circuit 100 is configured for solderless installation. Additionally, the modular circuit 100 configured for up to three pickups can function should only one or two of the instrument's pickups are connected to the circuit 100.

As shown in FIG. 8A, this circuit 100 can be implemented on a printed circuit board 101 to be housed in/on the stringed instrument. Connectors 102, 104, 105, 106, and 107 are provided on the circuit 100 and are interconnected by electrical traces to achieve the signal routing of the present disclosure. Any suitable type of connector can be used, such as a quick connector, a solderless terminal, a wire-to-board connector, fixed terminal block, etc. Features 103, 108, such as pads, vias, and the like may be provided for capacitor and ground connections.

As shown in the diagram of FIG. 8B, a connector 102 is configured to connect to hot and ground wires from an output jack (20). The connector 102 has two terminals, a first terminal (1) is connected to a terminal of a connector 105V for the volume potentiometer (50V) and a second terminal (2) is connected to ground.

Connectors 105V, 105T provided on the circuit 100 are configured to connect to terminals of control potentiometers (50V, 50T) and are preconfigured with electrical connections to other parts of the circuit 100 according to the present disclosure. Should a volume control potentiometer not be used, then a jumper cable (not shown) can be inserted into terminals of the connector 105V to bypass.

Connectors 106N, 106M, 106B provided on the circuit 100 are configured to connect to terminals of blending potentiometers (60B, 60N, 60B) for three double coiled pickups (neck, middle, and bridge) and are preconfigured with electrical connections to other parts of the circuit 100 according to the present disclosure. Connectors 107N, 107M, 107B similarly provided on the circuit 100 are configured to connect to terminals of SPDT switches (60B, 60N, 60B) for the three double coiled pickups (neck, middle, and bridge) and are preconfigured with electrical connections to other parts of the circuit 100 according to the present disclosure.

Although not shown in FIG. 8B, ground connectors are installed on the circuit 100 and allow for ground connections to the bridge grounding and the potentiometer housing grounding.

Finally, connectors 104N, 104M, 104B provided on the circuit 100 are configured to connect to leads for the three pickups (neck, middle, and bridge) and are preconfigured with electrical connections to other parts of the circuit 100 according to the present disclosure. These connectors 104N, 104M, 104B have five connection terminals to accommodate the several types of electronic pickups used for guitars, basses, and the like. For instance, some electronic pickups have two wires (e.g., a lead and a ground for a single coil pickup, or a hot lead and a ground lead for a Gibson style humbucker). Other electronic pickups have three wires (e.g., start wire, finish wire, and baseplate ground), four wires (e.g., north start, north finish, south start, and south finish for a Fender system humbucker) or five wires (e.g., north start, north finish, south start, south finish, and a bare ground for some types of humbuckers).

As noted, this circuit 100 can accommodate pickups other than just double coil pickups as discussed previously. Instead, this circuit 100 can accommodate single coil pickups, double coil pickups (humbucker) pickups, piezoelectric pickups, etc., as long as each pickup has at least two leads (i.e., at least a hot lead and a ground lead). To connect a single coil pickup to a connector 104, the hot lead is connected to terminal (1) of the connector 104, and the ground lead is connected to terminal (4) of the connector 104. Connecting a piezoelectric pickup would be similar. To connect a pickup with three leads (hot, ground, bare ground), then the hot lead is connected to terminal (1) of the connector 104, the ground lead is connected to terminal (4) of the connector 104, and the bare ground is connected to terminal (5) of the connector 104.

When a single coil pickup is used and connected to a respective connector 104, then a switch to select coil splitting would not be needed and would not be connected to the respective switch connector 107. The default electrical connections would still connect the single coil pickup to the respective connector 106 of a blending potentiometer for the single coil pickup.

To connect a pickup with four or five leads (North Start, North Finish, South Finish, South Start, and optional bare ground), such as a double coil humbucker pickup, then the North Start lead is connected to terminal (1), the North Finish lead is connected to terminal (2), the South Finish lead is connected to terminal (3), the South Start lead is connected to terminal (4), and any bare ground lead (if present) is connected to terminal (5). When a double coil pickup is used and connected to a respective connector 104, then a switch to select coil splitting can be connected to the respective switch connector 107. If such a switch is not used, however, the default electrical connections would still connect the double coil pickup to the respective connector 106 of a blending potentiometer for the double coil pickup.

Figure 9A:
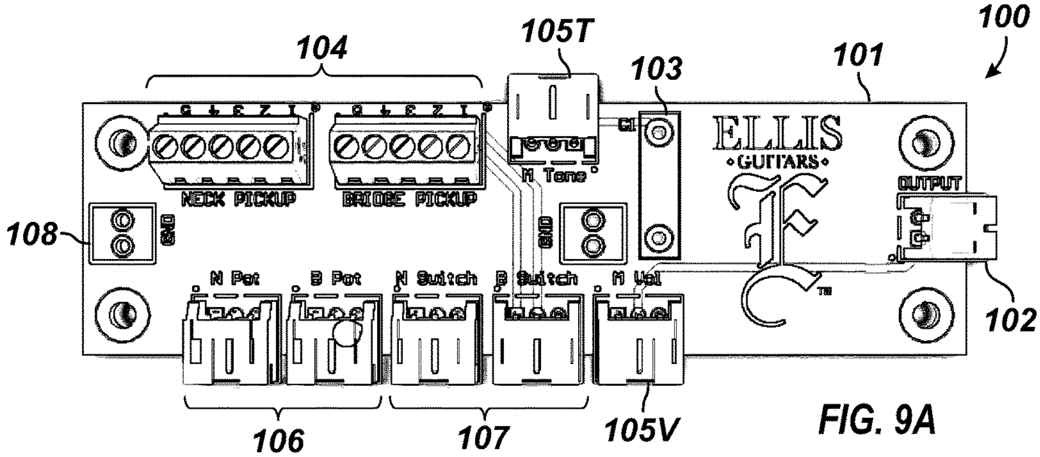
FIGS. 9A-9B depict another modular analog circuit for an electronic system of the present disclosure that can be integrated into a string instrument having up to two pickups.
Figure 9B:
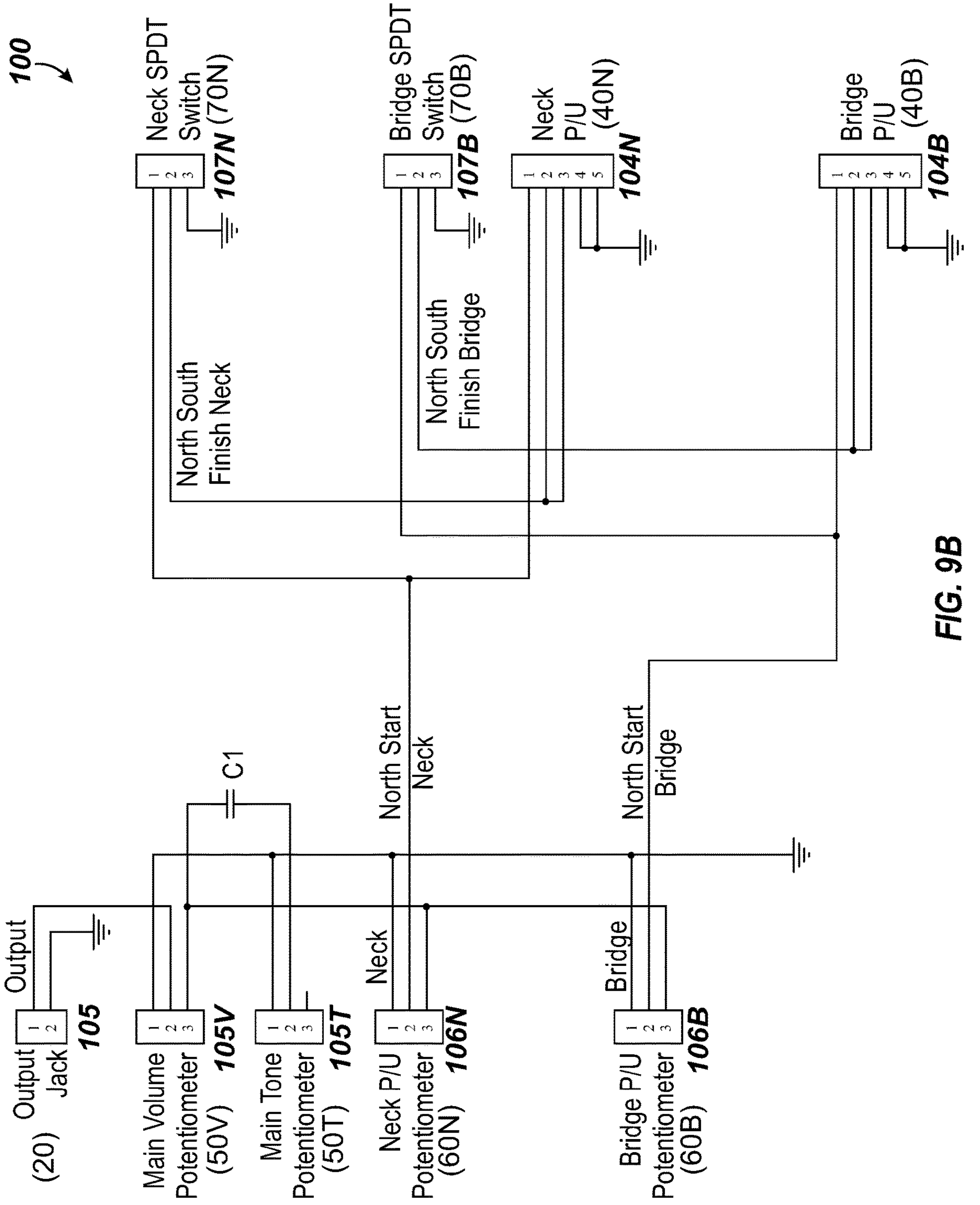

FIGS. 9A-9B depicts another modular analog circuit 100 for the electronic system 10 that can be integrated into a string instrument having up to two pickups, which can be of any type, including single coil, humbucker, piezoelectric, etc., as long as each pickup has at least two leads (i.e., at least a hot lead and a ground lead). The modular circuit 100 can accommodate any combination of the two pickups, and the modular circuit 100 can be used with or without volume and tone controls. Details of this modular circuit 100 are similar to that shown in FIGS. 8A-8B so that reference made above is incorporated herein again. This modular circuit 100 simply eliminates the features associated with a middle pickup. This modular circuit 100 configured for up to two pickups can function should only one of the instrument's pickups be connected to the circuit 100.

Figure 10A:
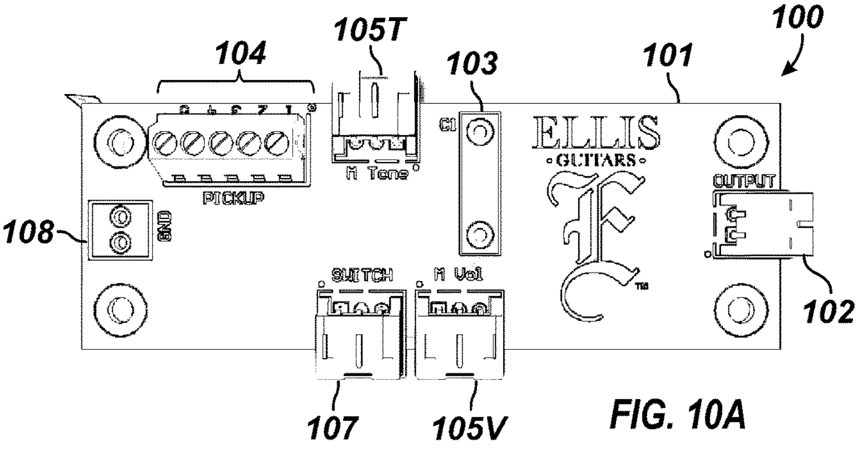
FIGS. 10A-10B depict yet another modular analog circuit for an electronic system of the present disclosure that can be integrated into a string instrument having one pickup.
Figure 10B:
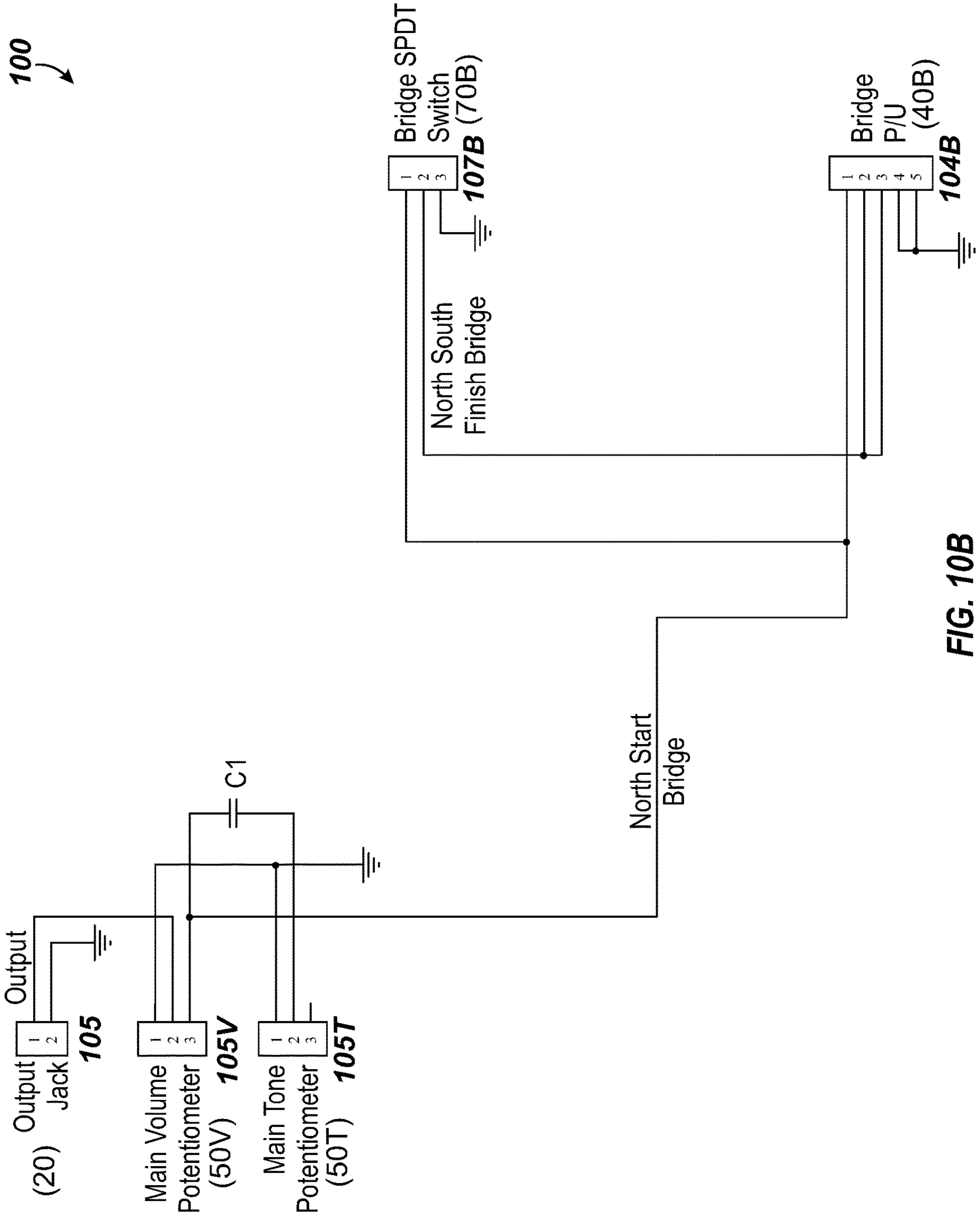

FIGS. 10A-10B depicts yet another modular analog circuit 100 for the electronic system 10 that can be integrated into a string instrument having one pickup, which can be of any type, including single coil, humbucker, piezoelectric, etc., as long as the pickup has at least two leads (i.e., at least a hot lead and a ground lead). The modular circuit 100 can be used with or without volume and tone controls. Details of this modular circuit 100 are similar to that shown in FIGS. 8A-8B and 9A-9B so that reference made above is incorporated herein again. This modular circuit 100 simply eliminates the features associated with a neck pickup and a middle pickup. Of course, the single pickup can be used in any position (bridge, middle, neck, etc.) on the guitar.

Figure 11A:
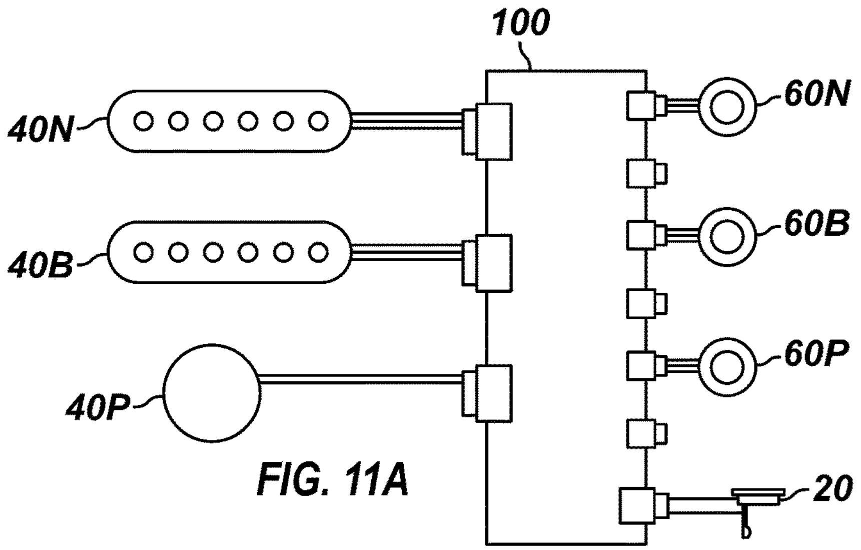
FIG. 11A shows a modular analog circuit for three pickups.
Figure 11B:
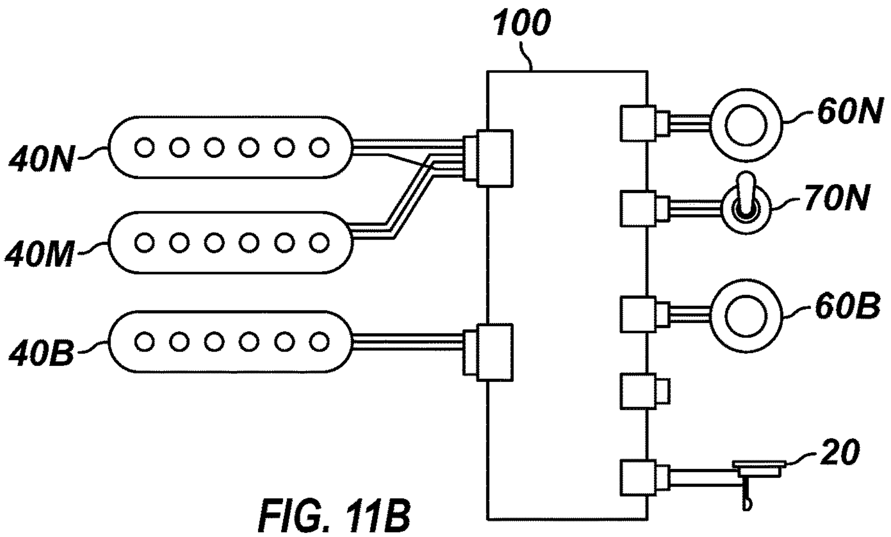
FIG. 11B shows another modular analog circuit two pickups, but three pickups are connected.
Figure 11C:
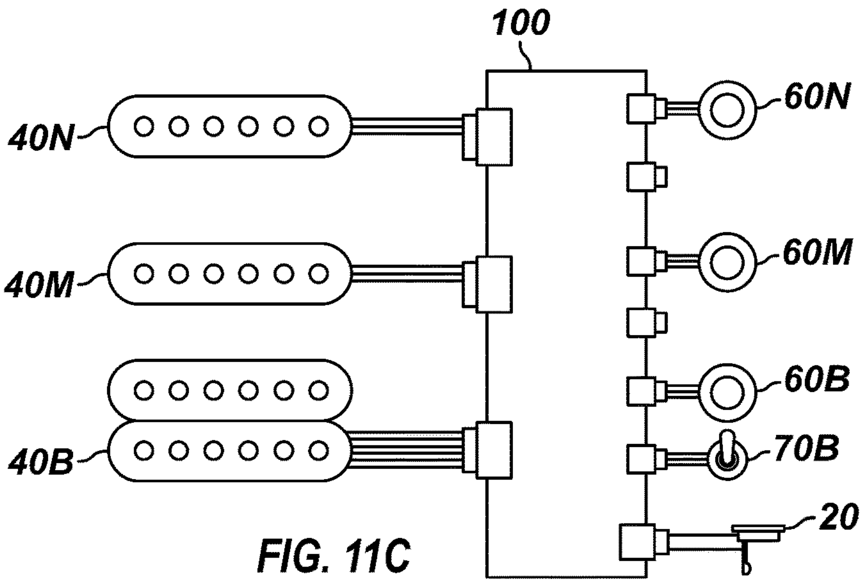
FIG. 11C shows yet another modular analog circuit for three pickups in a typical configuration for a guitar.

As noted above, the modular analog circuits 100 of the present disclosure can be used with distinct types of pickups, including single coil, double coil humbucker, piezoelectric, etc., as long as the pickup has at least two leads (i.e., at least a hot lead and a ground lead). Previous depictions have shown double coil pickups. For further illustration, FIGS. 11A-11C show additional depictions of some of the possible configurations contemplated herein. These and other configurations are possible.

FIG. 11A shows a modular analog circuit 100 for three pickups, which include a first (neck) single coil pickup 40N, a second (bridge) single coil pickup 40B, and a piezoelectric pickup 40P. The piezoelectric pickup 40P can be mounted at the bridge of the instrument or elsewhere. Each of the pickups 40N, 40B, 40P has an associated blending potentiometer 60N, 60B, 60P for blending to the output 20. Coil splitting switches are not connected.

FIG. 11B shows another modular analog circuit 100 for two pickups, but three pickups are connected. The pickup include a neck single coil pickup 40N, a middle single coil pickup 40M, and a bridge single coil pickup 40B. The bridge single coil pickup 40B is associated with a blending potentiometer 60B. The neck and middle single coil pickups 40N, 40M are connected to the same terminal, being set up like a double coil pickup. A coil splitting switch 70N and a blending potentiometer 60N are connected for these two pickups 40N, 40M. The neck and middle single coil pickups 40N, 40M can function as a hum-canceling, multi-coil single pickup spread across the guitar's body. The coil splitting switch 70N can function as follows: "up" position=neck pickup 40N only; "middle" position=both single coil pickups 40N, 40M wired as in a hum bucking configuration; and "down" position=middle pickup 40M only.

Finally, FIG. 11C shows yet another modular analog circuit 100 for three pickups in a typical configuration for a guitar. The three pickups include a double coil bridge pickup 40B, a single coil middle pickup 40M, and a single coil neck pickup 40N. Each of the pickups 40N, 40M, 40B has a blending potentiometer 60N, 60M, 60B connected to the associated terminal. The double coil bridge pickup 40B has a coil splitting switch 70B (two-way or three-way) connected to the associated terminal.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A system for use on a stringed instrument having an output and having pickups, at least one of the pickups having dual coils, the system comprising:

a switching circuit being configured to position on the stringed instrument and being associated respectively with each of the at least one of the pickups having the dual coils, each respective switching circuit electrically connected to the dual coils and being adjustable in real-time to select between at least two conditions for a signal of the at least one pickup having the dual coils; and a plurality of taper circuits being configured to position on the stringed instrument, each taper circuit being associated with a respective one of the pickups, each taper circuit being electrically connected between the respective pickup and the output and being adjustable in real-time to vary an amplitude of the signal from the respective pickup to the output.

2. The system of claim 1, further comprising a voltage dividing circuit being configured to position on the stringed instrument and being configured to connect to the output, each taper circuit being configured to electrically connect to the voltage dividing circuit.

3. The system of claim 2, wherein the voltage dividing circuit comprises a potentiometer having a resistive element connected between an input terminal and a ground terminal and having an output terminal movable relative to the resistance element.

4. The system of claim 3, wherein: each of the taper circuits is configured to electrically connect to the input terminal of the potentiometer, the output terminal of the potentiometer is configured to electrically connect to a hot terminal of the output, and the ground terminal of the potentiometer is configured to electrically connect to a ground terminal of the output.

5. The system of claim 2, further comprising a variable resistor being configured to position on the stringed instrument and being configured to connect to the voltage dividing circuit.

6. The system of claim 5, wherein the variable resistor is a potentiometer having a resistive element connected to an input terminal and having an output terminal movable relative to the resistive element, the input terminal of the potentiometer being configured to electrically connect to an input terminal of the voltage dividing circuit, the output terminal of the potentiometer being configured to electrically connect to a ground terminal of the voltage dividing circuit.

7. The system of claim 1, wherein each of the taper circuits comprises a potentiometer being electrically connected between the respective pickup and the output and being adjustable in real-time to taper the amplitude of the signal between upper and lower bounds.

8. The system of claim 1, wherein each of the taper circuits comprises a switch being electrically connected between the respective pickup and the output and being adjustable in real-time to toggle the amplitude of the signal between on and off conditions.

9. The system of claim 1, wherein the respective switching circuit for the at least one pickup having the dual coils is adjustable in real-time to select between first, second, and third conditions of the at least two conditions, the first condition selecting a north coil only for the signal of the dual coils, the second condition selecting a south coil only for the signal of the dual coils, and the third condition selecting a series wiring of the north coil and the south coil of the dual coils; or wherein the respective switching circuit for the at least one pickup having the dual coils is adjustable in real-time to select between first and second conditions of the at least two conditions, the first condition selecting a series wiring of the dual coils, the second condition selecting a parallel wiring of the dual coils.

10. A stringed instrument, comprising:

an output;

pickups, at least one of the pickups having dual coils;

a switching circuit being configured to position on the stringed instrument and being associated respectively with each of the at least one of the pickups having the dual coils, each switching circuit electrically connected to the dual coils and being adjustable in real-time to select between at least two conditions for a signal of the at least one pickup having the dual coils; and a plurality of taper circuits being configured to position on the stringed instrument, each taper circuits being associated with a respective one of the pickups, each taper circuit being electrically connected between the respective pickup and the output and being adjustable in real-time to vary an amplitude of the signal from the respective pickup for output to the output.

11. A kit for use on a stringed instrument having an output and having a first pickup, the first pickup having a plurality of first pickup leads, the kit comprising:

an output terminal having a hot contact and a ground contact configured to connect to the output, the ground contact disposed in electric communication with a circuit ground;

a first switch terminal having first, second, and third switch contacts, the third switch contact disposed in electric communication with the circuit ground;

a first taper terminal having an input contact, an output contact, and a ground contact, the ground contact disposed in electric communication with the circuit ground, the output contact disposed in electric communication with the hot contact of the output terminal;

a plurality of first lead contacts being configured to connect to the first pickup leads of the first pickup, the first lead contacts including:

a first of the first lead contacts disposed in electric communication with the first switch contact of the first switch terminal and disposed in electric communication with the input contact of the first taper terminal;

a second of the first lead contacts disposed in electric communication with the second switch contact of the first switch terminal;

a third of the first lead contacts disposed in electric communication with the second switch contact of the first switch terminal; and a fourth of the first lead contacts disposed in electric communication with the circuit ground.

12. The kit of claim 11, comprising a circuit board having:

connectors disposed thereon for the output terminal, the first switch terminal, the first taper terminal, and the first lead contacts; and electronic traces printed thereon for electronic communication therebetween.

13. The kit of claim 11, wherein the first lead contacts further comprise a fifth of the first lead contacts disposed in electric communication with the circuit ground.

14. The kit of claim 11, further comprising a ground terminal configured to connect an instrument ground of the stringed instrument to the circuit ground.

15. The kit of claim 11, further comprising a tone terminal having an input contact and an output contact, the input contact disposed in electric communication with the circuit ground, the output contact disposed in electric communication via a capacitor to the input contact of the first taper terminal.

16. The kit of claim 11, further comprising a potentiometer configured to connect to the input, output, and ground contacts of the first taper terminal.

17. The kit of claim 11 for the string instrument in which the first pickup is a dual coil pickup having a north coil and a south coil, wherein the kit further comprises:

a three-way switch configured to connect in electric communication with the first switch terminal, wherein the three-way switch is selectable between first, second, and third conditions, the first condition selecting the north coil only, the second condition selecting the south coil only, and the third condition selecting a series wiring of the north coil and the south coil; or a two-way switch configured to connect in electric communication with the first switch terminal, wherein the two-way switch is selectable between first and second conditions, the first condition selecting the north or south coil only, the second condition selecting a series wiring of the north coil and the south coil.

18. The kit of claim 17 for the first pickup leads of the dual coil pickup at least including a north start lead, a north finish lead, a south finish lead, and a south start lead, wherein: the first of the first lead contacts is configured to connect in electric communication with the north start lead, the second of the first lead contacts is configured to connect in electric communication with the north finish lead, the third of the first lead contacts is configured to connect in electric communication with the south finish lead, and the fourth of the first lead contacts is configured to connect in electric communication with the south start lead.

19. The kit of claim 11 for the stringed instrument further having a second pickup with a plurality of second pickup leads, the kit further comprising:

a second switch terminal having first, second, and third switch contacts, the third switch contact disposed in electric communication with the circuit ground;

a second taper terminal having an input contact, an output contact, and a ground contact, the ground contact disposed in electric communication with the circuit ground, the output contact disposed in electric communication with the hot contact of the output terminal; and a plurality of second lead contacts being configured to connect to the second pickup leads of the second pickup, the second lead contacts including:

a first of the second lead contacts disposed in electric communication with the first switch contact of the second switch terminal and disposed in electric communication with the input contact of the second taper terminal;

a second of the second lead contacts disposed in electric communication with the second switch contact of the second switch terminal;

a third of the second lead contacts disposed in electric communication with the second switch contact of the second switch terminal; and a fourth of the second lead contacts disposed in electric communication with the circuit ground.

20. The kit of claim 19 for the stringed instrument further having a third pickup with a plurality of third pickup leads, the kit further comprising:

a third switch terminal having first, second, and third switch contacts, the third switch contact disposed in electric communication with the circuit ground;

a third taper terminal having an input contact, an output contact, and a ground contact, the ground contact disposed in electric communication with the circuit ground, the output contact disposed in electric communication with the hot contact of the output terminal; and a plurality of third lead contacts being configured to connect to the third pickup leads of the third pickup, the third lead contacts including:

a first of the third lead contacts disposed in electric communication with the first switch contact of the third switch terminal and disposed in electric communication with the input contact of the third taper terminal;

a second of the third lead contacts disposed in electric communication with the second switch contact of the third switch terminal;

a third of the third lead contacts disposed in electric communication with the second switch contact of the third switch terminal; and a fourth of the second lead contacts disposed in electric communication with the circuit ground.

21. The kit of claim 19, further comprising a volume terminal having an input contact, an output contact, and a ground contact, the input contact disposed in electric communication with the output terminals of the first and second taper terminals, the output contact disposed in electric communication with the hot contact of the output terminal, the ground contact disposed in electric communication with the circuit ground.

22. The kit of claim 21, further comprising at least one: a volume potentiometer configured to connect in electric communication with the volume terminal; and a jumper configured to connect in electric communication with the volume terminal.

23. The kit of claim 21, further comprising:

a tone terminal at least having an input contact and an output contact, the input contact disposed in electric communication with the input contact of the volume terminal, the output contact disposed in electric communication with ground terminal of the volume terminal; and a tone potentiometer configured to connect in electric communication with the tone terminal.

24. The kit of claim 19 for the stringed instrument in which at least one of the first and second pickups is a dual coil pickup having a north coil and a south coil, wherein the kit further comprises:

a three-way switch configured to connect to the respective switch terminal, wherein the three-way switch is selectable between first, second, and third conditions, the first condition selecting the north coil only, the second condition selecting the south coil only, and the third condition selecting a series wiring of the north coil and the south coil; or a two-way switch configured to connect in electric communication with the respective switch terminal, wherein the two-way switch is selectable between first and second conditions, the first condition selecting the north or south coil only, the second condition selecting a series wiring of the north coil and the south coil.

25. The kit of claim 19, for the stringed instrument in which at least one of the first and second pickups is a single coil pickup, the respective pickup leads of the single coil pickup at least including a hot lead and a ground lead, wherein the first of the respective lead contacts is configured to connect in electric communication with the hot lead, and the fourth of the respective lead contacts is configured to connect in electric communication with the ground lead.

* * * * *